United States Patent [19]
Sakai et al.

[11] Patent Number: 5,580,619
[45] Date of Patent: Dec. 3, 1996

[54] ORGANIC-INORGANIC COMPOSITE PARTICLES AND PRODUCTION PROCESS THEREFOR

[75] Inventors: Yasuhiro Sakai, Takatsuki; Tudahiro Yoneda, Ibaraki; Shigefumi Kuramoto, Takatsuki, all of Japan

[73] Assignee: Nippon Shokubai Co., Ltd., Osaka, Japan

[21] Appl. No.: 568,839

[22] Filed: Dec. 7, 1995

Related U.S. Application Data

[62] Division of Ser. No. 340,860, Nov. 15, 1994, Pat. No. 5,503,932.

[30] Foreign Application Priority Data

Nov. 17, 1993 [JP] Japan ................................. 5-288536
Jul. 12, 1994 [JP] Japan ................................. 6-160019

[51] Int. Cl.$^6$ ................................................. G02F 1/1339
[52] U.S. Cl. ................................................. 428/1; 349/155
[58] Field of Search ........................... 428/402, 404; 359/81; 528/10, 32, 41, 481; 525/100, 474

[56] References Cited

U.S. PATENT DOCUMENTS

| 4,166,078 | 8/1979 | Getson ................................. 528/26 |
| 4,437,731 | 3/1984 | Sudo et al. ........................... 350/340 |
| 5,153,068 | 10/1992 | Kohara et al. ....................... 428/405 |
| 5,231,527 | 7/1993 | Takanashi et al. ..................... 359/81 |

FOREIGN PATENT DOCUMENTS

| 0002744 | 7/1979 | European Pat. Off. |
| 0449263 | 10/1991 | European Pat. Off. |
| 0534753 | 3/1993 | European Pat. Off. |
| 5779915 | 5/1982 | Japan . |
| 6195016 | 5/1986 | Japan . |
| 62-269933 | 11/1987 | Japan . |
| 6262328 | 12/1987 | Japan . |
| 1234826 | 9/1989 | Japan . |
| 4313727 | 11/1992 | Japan . |
| 0528038 | 2/1993 | Japan . |
| 6503180 | 4/1994 | Japan . |
| 9206402 | 4/1992 | WIPO . |
| WO9206402 | 4/1992 | WIPO . |

OTHER PUBLICATIONS

"The Chemical Handbook—Applied Chemistry" edited by the Japanese Chemical Soc., published by Maruzen KK and published in Dec. 1986, pp. 1399–1427.

"The Nippon Kayaku Dye Handbook (2nd Edition)" published by Nippon Kayaku KK and published in Dec. 1973, pp. 634–687.

*Primary Examiner*—Alexander Thomas
*Attorney, Agent, or Firm*—Roylance, Abrams, Berdo & Goodman, L.L.P.

[57] ABSTRACT

Organic-inorganic composite particles which include a (meth)acrylic resin framework and a polysiloxane framework having in its molecule an organosilicon containing a silicon atom directly and chemically combined with at least one carbon atom of the (meth)acrylic resin framework, and also contain 25 wt % or more of $SiO_2$ which constitutes the polysiloxane framework and have a mean particle diameter of $\geq 0.5$ μm. The particles have the mechanical resilience necessary to maintain a constant gap distance between a pair of members to be arranged with the correct gap distance between them, and the hardness and fracture strength necessary to maintain the gap constant with smaller numbers; and also do not readily cause physical damage to the members. The composite particles can be employed as spacers 8 for a liquid crystal display as they stand or with an adhesive layer formed on the surface. The composite particles can also have a conductive layer formed on the surface, and be employed as conductive particles.

6 Claims, 2 Drawing Sheets

ORGANIC-INORGANIC COMPOSITE PARTICLES AND PRODUCTION PROCESS THEREFOR

This application is a divisional application of Ser. No. 08/340,860 filed Nov. 15, 1994 now U.S. Pat. No. 5,503,932.

BACKGROUND OF THE INVENTION

The present invention relates to organic-inorganic composite particles, to a production process therefor and to liquid crystal displays which employ the organic-inorganic composite particles.

Liquid crystal displays (LCD) typically include two opposed electrode substrates, and spacers and a liquid crystal substance interposed between the aforementioned electrode substrates. The spacers are employed in order to maintain a liquid crystal layer uniform and constant in thickness.

High speed of response, high contrast, and a wide viewing angle, etc. are among display performance characteristics cited as required in practice in liquid crystal displays. For these performance characteristics to be manifested, the thickness of the liquid crystal layers, and in the final analysis the distance separating the two electrode substrates, must be maintained strictly constant.

Spacers for liquid crystal displays which meet such a need include silica particles made by the sol-gel method (Japanese Unexamined Patent Publication (Kokai) 62-269933), the calcined product of the aforementioned silica particles (Japanese Unexamined Patent Publication (Kokai) 1-234826), and styrene or divinylbenzene type polymer particles obtained by suspension polymerization of styrene monomers or divinylbenzene monomers, etc. (Japanese Unexamined Patent Publication (Kokai) 61-95016), etc. These are all spherical particles with a narrow particle diameter distribution and a well ordered particle diameter.

However, the above prior art has the following problems.

(A) Calcined products of silica particles made by the sol-gel method are not readily deformable and are very hard, and consequently when they are pressed in constructing liquid crystal displays they may cause physical damage to coating layers on the substrates such as vapor deposited electrodes, etc., orientating layers and color filters, etc., and cause faults in the display due to image unevenness or breakages of TFT array. There is also a large difference between the thermal expansion coefficient of these calcined silica particles and that of liquid crystals, and consequently in liquid crystal displays using such calcined silica particles the problem of so-called low-temperature bubbling is produced, so that when cooled in a low temperature environment, of −40° C. for example, the particles do not shrink to the same extent as the liquid crystals; voids are produced between the liquid crystals and the electrode substrates, and the display function becomes completely inoperative.

(B) Silica particles made by the sol-gel method are more pliant than calcined silica particles. However, because these uncalcined silica particles are weak in mechanical resilience the gap distance is prone to become uneven, producing image unevenness. Moreover, uncalcined silica particles give rise to the low-temperature bubbling problem as well as the calcined silica particles do.

(C) Since styrene or divinylbenzene type polymer particles are organic particles and are very pliant, they must be dispersed in large numbers onto an electrode substrate. This not only tends to raise manufacturing costs, but results in an increase in the area of the portion of the display screen where no image is formed. Moreover, the quality of the display is lowered due to lowering contrast and increasing image roughness, etc. due to the fact that the quantity of ionic and molecular impurities eluting from the spacers into the liquid crystal layer increases.

Accordingly, polymer particles have been proposed which are not easily deformed, formed by suspension polymerization using crosslinkable monomers such as divinylbenzene, etc., and using a large quantity of polymerization initiator (Japanese Unexamined Patent Publication (Kokai) 4-313727).

Polymer particles made by suspension polymerization of tetramethylolmethane tetraacrylate or tetramethylolmethane tetraacrylate and divinylbenzene, and then classified to regulate mean particle diameter and standard deviation of particle diameter have also been proposed (Japanese Patent Publication (Kohyo) 6-503180).

These polymer particles have the problem that they are prone to produce abnormal orientation in the liquid crystals on the surfaces of these particles. In liquid crystal displays no display is possible in spots in which the liquid crystals are abnormally orientated.

The present inventors have proposed spacers for liquid crystal displays which have a residual displacement after 10% deformation and an elastic modulus in compression at the 10% displacement of the particle diameter (an elastic modulus in 10% compression) within specified ranges, and which includes specific organic-inorganic composite particles (Japanese Patent Application 5-288536). The fact that these spacers for liquid crystal displays are harder than prior polymer particles means that the number of the particles dispersed on the electrode substrate can be decreased. However, the decrease in numbers means that the load per particle is increased, and the fracture strength is inadequate.

Prior electrically conductive particles are inorganic particles such as silica particles, etc., or polymer particles provided with a conductive layer formed on the surface of the particles. Commonly, conductive particles are employed in the electronics field for connecting between pairs of electrodes. Thus, by pressing a pair of electrodes with conducting particles interposed between them, an electrical connection is established between the two electrodes via the conductive particles.

Conductive particles including a polymer are too pliant, consequently when pressed the conductive layer cannot accompany the deformation of the particles, and the conductive layer may detach and fall from the particle surface, the electrodes may become too close and short. On the other hand, conductive particles including inorganic particles are too hard, and consequently it is impossible to broaden the area of contact with the electrodes to lower contact resistance, and if unreasonable pressure is applied when deforming so as to get large contact area, the conductive layer may detach and fall away. There are also problems the poor mechanical resilience of the conductive particles, and it becomes difficult to maintain a constant gap distance, causing poor contact.

SUMMARY OF THE INVENTION

One purpose of the present invention is to provide organic-inorganic composite particles which have the mechanical resilience needed in order to maintain constant the aforementioned gap distance between a pair of members placed with the proper gap, together with the hardness and fracture strength needed in order to maintain the aforementioned gap distance constant with smaller numbers of particles, and which do not readily cause physical damage to the aforementioned members.

Another purpose of the present invention is to provide a process for producing organic-inorganic composite particles which have the mechanical resilience needed to maintain a constant gap distance between a pair of spaced apart members, together with the hardness and strength needed in order to maintain the aforementioned gap distance constant with smaller numbers of particles, and which do not cause physical damage to the aforementioned members.

Another purpose of the present invention is to reduce physical damage to the electrode substrates of liquid crystal displays, and to improve picture quality of the liquid crystal displays.

An organic-inorganic composite particle according to a first embodiment of the present invention includes a particle body having an elastic modulus of 350–3000 kg/mm$^2$ in 10% compression, a residual displacement of 0–5% after 10% deformation, a mean particle diameter of 0.5–50 μm add a coefficient of variation of 20% or less in particle diameter, the particle body including:

an organic group; and a polysiloxane framework which has in its molecule an organosilicon containing a silicon atom directly and chemically combined with at least one carbon atom of the organic group.

DETAILED DISCLOSURE OF THE INVENTION

Figure 1:
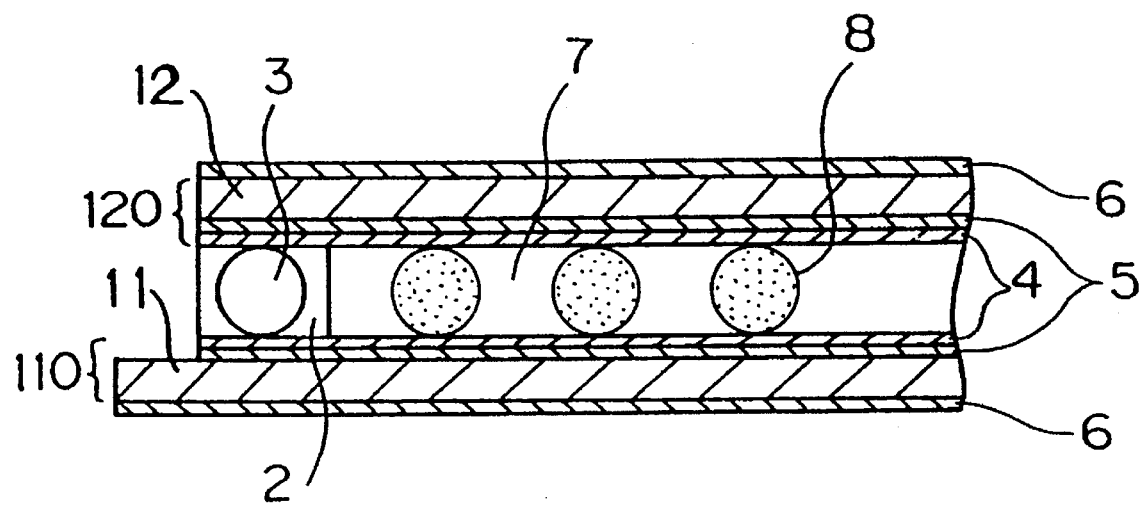
FIG. 1 is a fragmentary cross-sectional diagram representing an embodiment of a liquid crystal display of the present invention.

An organic-inorganic composite particle according to a first embodiment of the present invention includes a particle body having an elastic modulus of 350–3000 kg/mm$^2$ in 10% compression, a residual displacement of 0–5% after 10% deformation, a mean particle diameter of 0.5–50 μm and a coefficient of variation of 20% or less in particle diameter, the particle body including:

an organic group; and a polysiloxane framework which has in its molecule an organosilicon containing a silicon atom directly and chemically combined with at least one carbon atom of the organic group.

In the first embodiment of the organic-inorganic composite particle of the present invention, for example, the organic group is at least one monovalent group selected from the group consisting of alkyl groups of 1–10 carbon atoms, aryl groups of 6–10 carbon atoms and unsaturated aliphatic residual groups of 2–14 carbon atoms. These monovalent may have a substituent group.

The first embodiment of the organic-inorganic composite particle of the present invention may further include a conductive layer formed on a surface of the particle body.

The first embodiment of the organic-inorganic composite particle of the present invention may further include an adhesive layer formed on a surface of the particle body.

The first embodiment of the organic-inorganic composite particle of the present invention may be colored by including in the particle body at least one selected from the group consisting of dyes and pigments.

An organic-inorganic composite particle according to a second embodiment of the present invention includes a particle body having an organic polymer framework and a polysiloxane framework. The polysiloxane framework has in its molecule an organosilicon containing a silicon atom directly and chemically combined with at least one carbon atom of organic polymer framework. The quantity of $SiO_2$ which constitutes the polysiloxane framework is $\geq 25$ wt % of the total weight of the particle body. The particle body has a mean particle diameter of $\geq 0.5$ μm.

In the second embodiment of the organic-inorganic composite particle of the present invention, the particle body may further include an organic group, and the polysiloxane framework may have a silicon atom directly and chemically combined with at least one carbon atom of the organic group. The organic group here is, for example, at least on monovalent group selected from the group consisting of alkyl groups of 1–10 carbon atoms, aryl groups of 6–10 carbon atoms and unsaturated aliphatic residual groups of 2–14 carbon atoms. These monovalent groups may have a substituent group.

In second embodiment of the organic-inorganic composite particle of the present invention, the particle body may further have a fracture strength which satisfies the following equation:

$$G \geq 14 \times Y^{1.75}$$

where: G indicates a fracture strength (kg); and Y indicates a particle diameter (mm).

In the second embodiment of the organic-inorganic composite particle of the present invention, the particle body may have an elastic modulus of 350–3000 kg/mm$^2$ in 10% compression, a residual displacement of 0–5% after 10% deformation, a mean particle diameter of 0.5–50 μm, and a coefficient of variation of $\geq 20\%$ in particle diameter.

The second embodiment of the organic-inorganic composite particle of the present invention may further have a conductive layer formed on a surface of the particle body.

The second embodiment of the organic-inorganic composite particle of the present invention may further have an adhesive layer formed on a surface of the particle body.

The second embodiment of the organic-inorganic composite particle of the present invention may be colored by including in the particle body at least one selected from the group consisting of dyes and pigments.

A process for producing organic-inorganic composite particles according to the present invention includes a condensation step and a heat-treatment step.

The condensation step includes hydrolyzing and condensing a silicon compound to give condensed particles.

The silicon compound is at least one silicon compound selected from the group consisting of compounds represented by General Formula (1) below and derivatives thereof:

$$R'_m Si(OR'')_{4-m} \quad (1)$$

where:

R' indicates a monovalent group selected from the group consisting of alkyl groups of 1–10 carbon atoms, aryl groups of 6–10 carbon atoms and unsaturated aliphatic residual groups of 2–14 carbon atoms, which may have a substituent group;

R'' indicates a hydrogen atom or a monovalent group selected from the group consisting of alkyl groups of 1–5 carbon atoms and acyl groups of 2–5 carbon atoms;

m indicates an integer of 0–3;

when m is 2, the two R's may be either different from or identical with one another;

when m is 3, the three R's may differ from one another, or two or more of the R's may be identical;

when 4-m is 2, the two OR''s may be either different from or identical with one another;

when 4-m is 3, the three OR''s may be different from each other, or two or more of the OR''s may be identical; and when 4-m is 4, the four OR''s may be different from each other, or two or more of the OR''s may be identical;

with the proviso that only a compound selected from the group consisting of compounds of m=1 in the Formula (1) and derivatives thereof can be employed alone as the silicon pound, and that 2 or more silicon compounds used together to include either or both of: a compound selected from the group consisting of compounds of m=1 in the (1) and derivatives thereof; and a compound selected from the group consisting of compounds of m=0 in the Formula (1) and derivatives thereof.

The heat-treatment step includes treating the condensed particles by heating at a temperature of ≧1000° C. to obtain particle bodies of the organic-inorganic composite particles. The heat-treatment step is performed, for example, in an atmosphere with an oxygen concentration of ≧10 vol %.

The process of the present invention for producing organic-inorganic composite particles may further include a conducting-layer-forming step of forming a conducting layer on a surface of the particle body.

The process of the present invention for producing organic-inorganic composite particles may further include an adhesive-layer-forming step of forming an adhesive layer on a surface of the particle body.

The process of the present invention for producing organic-inorganic composite particles may further include a coloring step of coloring the produced particles during and/or after at least one step selected from the group consisting of the condensation step and the heat-treatment step.

The process of the present invention for producing organic-inorganic composite particles may further include a polymerization step, wherein the silicon compound is a first silicon compound containing a radical-polymerizable group.

The first silicon compound which contains a radical-polymerizable group is at least one selected from the group consisting of compounds represented by the following general formulae and derivatives thereof:

$$\begin{array}{c} R^1 \\ | \\ CH_2 = C - COOR^2 - Si(OR^3)_3 \end{array} \quad (2)$$

where:

$R^1$ indicates a hydrogen atom or a methyl group;

$R^2$ indicates an alkylene group of 1–10 carbon atoms which may have a substituent group; and $R^3$ indicates a hydrogen atom or at least one monovalent group selected from the group consisting of alkyl groups of 1–5 carbon atoms and acyl groups of 2–5 carbon atoms;

$$\begin{array}{c} R^4 \\ | \\ CH_2 = C - Si(OR^5)_3 \end{array} \quad (3)$$

where:

$R^4$ indicates a hydrogen atom or a methyl group; and $R^5$ indicates a hydrogen atom or at least one monovalent group selected from the group consisting of alkyl groups of 1–5 carbon atoms and acyl groups of 2–5 carbon atoms;

$$\begin{array}{c} R^6 \\ | \\ CH_2 = C - R^7 - Si(OR^8)_3 \end{array} \quad (4)$$

where:

$R^6$ indicates a hydrogen atom or a methyl group;

$R^7$ indicates an alkylene group of 1–10 carbon atoms, which may have a substituent group; and $R^8$ indicates a hydrogen atom or at least one monovalent group selected from the group consisting of alkyl groups of 1–5 carbon atoms and acyl groups of 2–5 carbon atoms.

The polymerization step includes subjecting the radical-polymerizable group of the silicon compound to radical polymerization to obtain polymerized particles, during and/or after the condensation step, and before the heat-treatment step. The heat-treatment step here includes treating the polymerized particles by heating at a temperature of ≧800° C. to obtain particle bodies of organic-inorganic composite particles.

When the production process of the present invention further includes the polymerization step, it may still further include a coloring step of coloring the produced particles during and/or after at least one step selected from the group consisting of the condensation step, the polymerization step and the heat-treatment step.

When the production process of the present invention further includes the polymerization step, it may still further include a recondensation step of further condensing the polymerized particles between the polymerization step and the heat-treatment step; and the heat-treatment step may be a step of treating the recondensed particles by heating at a temperature of ≧800° C.

When the production process of the present invention further includes the polymerization step and the recondensation step, it may still further include a coloring step of coloring the produced particles during and/or after at least one step selected from the group consisting of the condensation step, the polymerization step, the recondensation step and the heat-treatment step.

When the production process of the present invention further includes the polymerization step, it may still further include a conductive-layer-forming step of forming a conductive layer on a surface of the particle body.

When the production process of the present invention further includes the polymerization step, it may still further include an adhesive-layer-forming step of forming an adhesive layer on a surface of the particle body.

A liquid crystal display according to a first embodiment of the present invention includes a first electrode substrate, a second electrode substrate, a sealing material, spacer for the liquid crystal display, and a liquid crystal. The second electrode substrate is arranged opposite to the first electrode substrate. The sealing material binds (joins) the first electrode substrate and the second electrode substrate at their respective circumferential edges. The spacer for the liquid crystal display is interposed between the first electrode substrate and the second electrode substrate, functions to maintain a gap distance between the two electrode substrates, and includes the organic-inorganic composite particles according to the first embodiment of the present invention described above. The liquid crystal is packed into space defined by the first electrode substrate, the second electrode substrate and the sealing material.

In the first embodiment of the crystal display of the present invention, the first embodiment of the organic-inorganic composite particles may further have an adhesive layer formed on a surface of the particle body.

In the first embodiment of the crystal display of the present invention, the first embodiment of the organic-inorganic composite particles may be colored by including in the particle body at least one selected from the group consisting of dyes and pigments.

A liquid crystal display according to a second embodiment of the present invention includes a first electrode substrate, a second electrode substrate, a sealing material, a spacer for the liquid crystal display, and a liquid crystal. The second electrode substrate is arranged opposite to the first electrode substrate. The sealing material binds (joins) the first electrode substrate and the second electrode substrate at their respective circumferencial edges. The spacer for the second embodiment of the liquid crystal display is interposed between the first electrode substrate and the second electrode substrate, functions to maintain the gap distance between the two electrode substrates, and includes the second embodiment of the organic-inorganic composite particles of the present invention described above. The liquid crystal is pack into space defined by the first electrode substrate, the second electrode substrate and the sealing material.

In the second embodiment of the crystal display of the present invention, the second embodiment of the organic-inorganic composite particles may further have an adhesive layer formed on a surface of the particle body.

In the second embodiment of the crystal display of the present invention, the second embodiment of the organic-inorganic composite particles may be colored by including in the particle body at least one selected from the group consisting of dyes and pigments.

In the present invention, the polysiloxane is defined as a compound in which siloxane units represented by the following formula (5)

(5)

are chemically combined with each other in sequence to constitute a 3-dimensional network.

The organic group in the present invention is at least one selected from the group consisting of monovalent, divalent and trivalent groups which have 1–10, and preferably 1–5, carbon atoms and in which at least one carbon atom is directly and chemically combined with one or more hydrogen atoms. As the aforementioned organic groups, monovalent groups selected from the group consisting of alkyl groups of 1–10 carbon atoms, aryl groups of 6–10 carbon atoms and unsaturated aliphatic residual groups of 2–14 carbon atoms, which may have a substituent group, are preferred; monovalent groups selected from the group consisting of alkyl groups of 1–5 carbon atoms, and unsaturated aliphatic residual groups of 2–5 carbon atoms (e.g. vinyl groups, allyl groups, ethynyl groups, propynyl groups) are more preferred. These organic groups have the advantages that they are cheaper and more easily obtained than other organic groups, and are easier to handle, etc. Examples of the substituent groups allowable in the case of alkyl group include glycidoxy groups, mercapto groups and amino groups, etc.; from one to all of the hydrogen atoms of the alkyl group can be substituted, but preferably 1–3 hydrogen atoms are substituted. Concrete examples of the aforementioned organic groups include methyl, ethyl, propyl, butyl, vinyl, 3-glycidoxypropyl, 3-mercaptopropyl, 3-(2-aminoethylaminopropyl) and phenyl, etc.

Organosilicon in the present invention means that at least one of the carbon atoms of an organic group is directly and chemically combined with at least one of the silicon atoms contained in the siloxane unit above. One to three organic groups can be chemically combined per silicon atom.

Because the first embodiment of the organic-inorganic composite particles of the present invention has simultaneously both inorganic structural units represented by Formula (5) above and organosilicon, the particles are provided simultaneously with the great hardness characteristic of inorganic substances, and the high mechanical resilience characteristic of organic substances. The measures indicating the hardness and mechanical resilience referred to above are the elastic modulus in compression and the residual displacement; these will be discussed in more detail hereafter. In order to satisfy the aforementioned ranges for the elastic modulus in 10% compression and the displacement after 10% deformation; the proportion of polysiloxane in the organic-inorganic composite particles which has organosilicon in its molecule is preferably ≧70 wt %, and more preferably 100%. Examples of components other than polysiloxane having organosilicon in its molecule include oxides of boron, aluminum, gallium, indium, phosphorus, titanium and zirconium, etc.

The elastic modulus in 10% compression referred to in the present invention is the value determined by the method of determination below. Using a Shimadzu micro compression tester (KK Shimadzu Seisakusho MCTM-200), at room temperature (25° C.) the test particles are scattered on a testing platform (material: flat SKS disk) and a load is applied to a single particle at a constant loading rate towards the center of the particle using a round frustrum-shaped loading element (material : diamond) with 50 μm in diameter; the particle is deformed until compression displacement is 10% of the particle diameter, and the load in kilogram and compression displacement in millimeters at 10% deformation are found. The elastic modulus in compression calculated by substituting the load and compression displacement found and the radius of the particles into the following equation $$E=\{3 \times F \times (1-K2)\}/(2^{1/2} \times S^{3/2} \times R^{1/2})$$

(where E: Elastic modulus in compression (kg/mm$^2$)

F: Compression load (kg)

K: Poisson ratio of the particle (constant 0.38)

S: Compression displacement (mm)

R: Particle radius (mm))

is the elastic modulus in 10% compression. Directly after this, the load is removed at the same rate as when applying the load, until the load becomes 0.1 g, and the extent of the residual displacement assumed by the particle to which no load is applied is found by extrapolating tangent at 0.1 g in the diagram obtained to the horizontal axis at which the load applied is zero. The residual displacement is this deformation as a percentage of particle diameter. This procedure is repeated on 3 different particles, and the mean values for the elastic modulus in 10% compression and residual displacement of the particles are taken as the measures of the hardness and mechanical resilience of the particles.

When the elastic modulus in 10% compression of prior spacer particles were determined by the method above, the values were 4400 kg/mm$^2$ for calcined silica particles and 300 kg/mm$^2$ styrene type polymer particles.

By contrast, with the first embodiment of the composite particles of the present invention, the particle body can regulated to have a hardness chosen at will to give an elastic modulus in 10% compression in the range 35–3000 kg/mm$^2$, and preferably in the range 550–2500 kg/mm$^2$, and even more preferably in the range 550–2000 kg/mm$^2$. If the elastic modulus in 10% compression falls below the aforementioned range, there are the previously mentioned problems of giving a rise in production costs due to an increase in the number of spacer particles that have to be used, lowering contrast and increasing image roughness, etc.; and if it is greater there are the previously describe problems of physical damage to vapor deposited layers coating layers on the substrates, and low-temperature bubbling, etc.

Similarly, as far as residual displacement after 10% deformation is concerned, the residual displacement of non-calcined silica particles was 8%; but the first embodiment of the composite particles of the present invention is a composite particle with superior mechanical resilience, having a residual displacement in the range 0–5%, and preferably 0–4%. A residual displacement after 10% deformation above the aforementioned range causes the previously mentioned problem of image unevenness, etc.

An elastic modulus in 10% compression and residual displacement within the above ranges are achieved by regulating the proportion of organic groups in the particles. For example, raising the proportion of organic groups lowers the elastic modulus in 10% compression and residual displacement, and lowering the proportion of organic groups increases the elastic modulus in 10% compression and the residual displacement.

In the first embodiment of the composite particles of the present invention the proportion accounted for organic groups in the particles, representing the quantity of organic groups by the total weight of carbon atoms, is usually 5–17 wt %, and is preferably 7–17 wt %. The reason is that if there are fewer organic groups than the above range, elastic modulus in compression and residual displacement become large and the particles become too hard, or adequate mechanical resilience cannot be obtained; and if there are more, the elastic modulus in compression becomes too small and the particles become more pliant than necessary. When the quantity of organic groups is within the aforementioned range hardness and mechanical resilience which are effective to avoid the aforementioned problems are obtained.

In the first embodiment of the composite particles of the present invention the mean particle diameter of the particle body can be regulated at will according to the size of the intended gap distance, but will usually be 0.5–50 μm, and is preferably 1–20 μm, and more preferably 1–15 μm. With diameter outside the aforementioned range it is impossible to achieve the gap distance of a liquid crystal display for practical use, and the particle diameter is in a range which precludes use as an ordinary spacer.

From the point of view of the uniformity of the gap distance, the coefficient of variation in the particle diameter of the particle body in the first embodiment of the composite particles of the present invention is $\geq 20\%$, preferably $\geq 10\%$, and more preferably $\geq 8\%$. When it is over the above upper limit the uniformity of gap distance is prone to be lowered, causing image unevenness. The coefficient of variation of particle diameter is defined by the following equation Coefficient of variation in particle diameter (%)=$(\sigma/\overline{X})\times 100$ ($\sigma$: Standard deviation of particle diameter
$\overline{X}$: Mean particle diameter).

In the present invention, mean particle diameter and the standard deviation of particle diameter are found by measuring the particle diameter on 200 particles chosen at random on electron micrographs and using the equations below.

$$\text{Mean particle diameter } (\overline{X}) = \left( \sum_{i=1}^{n} Xi \right)/n$$

Standard deviation of particle diameter ($\sigma$) =

$$\left( \left( \sum_{i=1}^{n} (\overline{X} - Xi)^2 \right)/(n-1) \right)^{1/2}$$

The organic-inorganic composite particles according to the second embodiment of the present invention include an organic polymer framework and a polysiloxane framework having organosilicon in its molecule in which the silicon atom is directly and chemically combined with at least one carbon atom in the organic polymer framework, and the quantity of SiO$_2$ composing the polysiloxane framework is $\geq 2$ 5 wt %; and hence they have the great hardness characteristic of the polysiloxane 3-dimensional framework and the high mechanic resilience and fracture strength characteristic of the organic polymer framework. Consequently, the second embodiment of the organic-inorganic composite particles of the present invention has the mechanical resilience necessary in order to maintain a constant gap distance between a pair of members which should be arranged with the correct gap distance, and have the hardness and fracture strength necessary in order to maintain the aforementioned gap distance constant with smaller numbers, and which also do not readily cause physical damage to these members. Since the second embodiment of the organic-inorganic composite particles of the present invention further has a mean particle diameter of $\geq 0.5$ μm, they are useful in forming a gap distance between a pair of members.

The organic polymer framework includes at least a main chain but can include main chains, side chains, branching chains an crosslinking chains derived from an organic polymer. There are no particular restrictions as to the molecular weight, composition or structure of the organic polymer of the presence or absence of functional groups.

The organic polymer is, for example, at least one selected from the group consisting of (meth)acrylic resins, polystyrene, poly(vinyl chloride), poly(vinyl acetate), polyolefins and polyesters. Preferred organic polymer frameworks have a main chain constituted from the repeating unit —C—C— (referred to as "vinyl polymers" hereafter), because they form particles of particularly outstanding mechanical resilience.

A vinyl polymer is, for example, at least one selected from the group consisting of (meth)acrylic resins, polystyrenes, poly(vinyl chloride), poly(vinyl acetate) and polyolefins. Preferably the vinyl polymer is at least one selected from the group consisting of (meth)acrylic resins and (meth)acrylic-styrene resins. More preferably the vinyl polymer is a (meth)acrylic resin.

With at least one carbon atom constituting the organic polymer framework, a silicon atom in polysiloxane is directly and chemically combined.

The quantity of $SiO_2$ which constitutes the polysiloxane is $\geq 25$ wt %, preferably 30–80 wt %, more preferably 33–70 wt %, and most preferably 37–60 wt %, of the weight of the organic-inorganic composite particles of the present invention. When it is within the above range the particles have a beneficial hardness, mechanical resilience and fracture strength. When it is lower than 25 wt % the hardness characteristic of inorganic substances is not manifested, and there is the problem described hereafter that the elastic modulus in 10% compression is too small. When it exceeds the aforementioned range the mechanical resilience and fracture strength which organic polymers have are lost and residual displacement may become large or the particles may break.

The quantity of $SiO_2$ which constitutes the polysiloxane framework is the percentage by weight found by determining the weight before and after calcining the particles at a temperature of $\geq 1000°$ C. in an oxidizing atmosphere such as air.

The second embodiment of the organic-inorganic composite particles of the present invention can also contain inorganic components other than polysiloxane. Examples of inorganic components other than polysiloxane include oxides of boron, aluminum, titanium and zirconium, etc. The quantity of inorganic components other than polysiloxane is preferably 0–20 wt %, and more preferably 0–10 wt %. When it is outside the aforementioned range there is a fear that the hardness, mechanical resilience or fracture strength may not be manifested effectively.

The second embodiment of the organic-inorganic composite particles of the present invention has a mean particle diameter of $\geq 0.5$ μm, preferably 0.5–50 μm, more preferably 1–25 μm, and most preferably 1.5–20 μm. When it is under 0.5 μm it is difficult to form a gap distance between a pair of members. When it is outside the aforementioned range, the particle diameter is in a range which precludes use as spacers for liquid crystal displays or as conductive particles.

From the perspective of the uniformity of the gap distance when they are used as spacers, the second embodiment of the organic-inorganic composite particles of the present invention have a coefficient of variation in particle diameter of $\geq 20\%$, preferably $\geq 10\%$, and more preferably $\geq 8\%$. When it is greater than the aforementioned range the uniformity of the gap distance is prone to be lowered, producing image unevenness.

The second embodiment of the organic-inorganic composite particles of the present invention is a composite particle which contains both inorganic structural units represented by Formula (5) above and an organic polymer framework, and the inorganic structural units and the organic polymer are chemically combined. Therefore, the second embodiment of the organic-inorganic composite particles the present invention is provided with both the great hardness characteristic of inorganic substances and the high mechanical resilience and fracture strength characteristic of organic polymers.

The second embodiment of the organic-inorganic composite particles can also be composite particles which contain inorganic structural units represented by Formula 5 above, and an organic polymer framework, and also organic groups as described above with respect to the first embodiment of the composite particles, in which the inorganic structural units and the organic groups are chemically combined.

The measure indicating hardness is elastic modulus in 10% compression and the measure indicating mechanical resilience is residual displacement after 10% deformation.

Fracture strength can also be investigated by using the micro compression tester previously described. For single test particles scattered on the testing platform a load is applied at a constant loading rate towards the center of the particle using a round frustrum-shaped loading element as described previously, and the compression load at which the particle breaks can be found.

The hardness of the second embodiment of the organic-inorganic composite particles of the present invention can be regulated at will to give an elastic modulus 10% compression preferably in the range 350–3000 kg/mm$^2$, more preferably in the range 400–2500 kg/mm$^2$ and even more preferably in the range 500–2000 kg/mm$^2$. When the elastic modulus in 10% compression is lower than this range, as described previously, there are fears of giving a rise in production costs, lowering contrast, increasing image roughness, and is more than this range, as mentioned previously, there is a fear of physical damage to layers attached to the substrates and to coating layers, and a fear of low-temperature bubbling.

As regards residual displacement after 10% deformation, the residual displacement of uncalcined silica particles was 8%, but the second embodiment of the composite particles of the present invention is a composite particle with outstanding mechanical resilience having a residual displacement preferably in the range 0–5%, more preferably 0–4%, and more preferably in the range 0–3%. When residual displacement after 10% deformation is greater than the aforementioned range, they are prone to cause image unevenness when employed as spacers for liquid crystal displays.

Similarly, as regards fracture strength the second embodiment of the composite particles of the present invention is a composite particle which preferably satisfies the following equation $$G \geq = 14 \times Y^{1.75}$$

(where G and Y are as described above) and more preferably satisfy the following equation $$G \geq 21 \times Y^{1.75}$$

(where G and Y are as described above)
When the Fracture strength does not satisfy the aforementioned equations the particles may be broken in making liquid crystal displays because of their low fracture strength, making it impossible to maintain a constant gap distance between the electrode substrates.

An elastic modulus in 10% compression and residual displacement within the above ranges can be achieved by regulating the quantity of the polysiloxane framework or the polymer framework in the particles. For example, lowering the quantity of the polysiloxane framework lowers the elastic modulus in 10% compression and residual displacement; and raising the quantity of the polysiloxane framework increases the elastic modulus in 10% compression and residual displacement.

The first and second embodiments of the composite particles of the present invention can also be colored by including least one selected from the group consisting of dyes and pigments. The color of the particles is preferably a color which does not transmit light. Non-transmitting colors are preferred for coloring spacers for liquid crystal displays cause they can prevent light of the backlight lamp from escaping, and can improve contrast. Examples of non-transmitting colors include colors such as black, dark blue, navy blue, purple, blue, dark green, green, brown and red, etc.; but black, dark blue and navy blue are particularly preferred. Suitable pigments and/or dyes selected according to the intended color can be used: examples, according to classification of dyeing method, include disperse dyes, acidic dyes, basic dyes, reactive dyes sulfur dyes, etc. Concrete examples of these dyes are described in "The Chemical Handbook—Applied Chemistry" (edited by the Japanese Chemical Society), Maruzen KK (1986) pp 1399–1427, and "The Nippon Kayaku dye handbook" by Nippon Kayaku KK (1973).

A known method can be adopted as the method for coloring the first and second embodiments of the organic-inorganic composite particles of the present invention. It can be accomplished for example by the methods described in "The Chemical Handbook—Applied Chemistry" (edited by the Japanese Chemical Society) and "The Nippon Kayaku Dye Handbook" above. Colored composite particles of the present invention are provided with the hardness and mechanical resilience described above, and hence are particularly useful in raising the picture quality of liquid crystal displays.

The preferred specifications of the second embodiment of the organic-inorganic composite particles of the present invention. For use as spacers for liquid crystal displays are as follows.

(1) A fracture strength G preferably $\geq 14 \times Y^{1.75}$ and more preferably $\geq 21 \times Y^{1.75}$.

(2) Polysiloxane framework $\geq 25$ wt %; elastic modulus of 350–3000 kg/mm$^2$ in 10% compression; residual displacement of 0–5% after 10% deformation; mean particle diameter of 0.5–50 μm; and coefficient of variation of $\geq 20\%$ in particle diameter.

(3) Polysiloxane framework 30–80 wt %; elastic modulus of 400–2900 kg/mm$^2$ in 10% compression; residual displacement of 0–4% after 10% deformation; mean particle diameter of 1–25 μm; an coefficient of variation of $\geq 10\%$ in particle diameter.

(4) Polysiloxane framework 33–70 wt %; elastic modulus of 500–280 kg/mm$^2$ in 10% compression; residual displacement of 0–3% after 10% deformation; mean particle diameter of 1.5–20 μm and coefficient of variation of $\geq 8\%$ in particle diameter.

(5) Polysiloxane framework 37–60 wt %; elastic modulus of 550–270 kg/mm$^2$ in 10% compression; residual displacement of 0–2% after 10% deformation; mean particle diameter of 2–15 μm; and coefficient of variation of $\geq 6\%$ in particle diameter.

(6) (2)–(5) above with a fracture strength G preferably $\geq 14 \times Y^{1.75}$ and more preferably $\geq 21 \times Y^{1.75}$.

(7) (1)–(6) above, the particle body being colored by including at least one selected from the group consisting of dyes and pigments.

There are no particular restrictions as to the shapes of the first and second embodiments of the organic-inorganic composite particles of the present invention, and they can be any particle shape, such as spheres, needles, sheets, flakes, splinters, rugby football-shaped, cocoon shaped or star-shaped; but for use as liquid crystal display spacers spheres are preferred on the grounds of giving a uniformly constant gap distance. This is because when the particles are spherical they have a constant or nearly constant diameter in all or nearly all directions.

Organic-inorganic composite particles of the present invention an be made by the production process described below; but they can also be produced by other processes.

Compounds used in the present invention represented by the aforementioned General Formula (1) have 1–4 hydrolyzable groups; the hydrolyzable groups being monovalent groups selected from the groups consisting of a hydroxyl group, alkoxy groups of 1–5 groups and acyloxy groups of 2–5 carbon atoms, and preferably methoxy groups, ethoxy groups, propoxy groups or acetoxy groups. These hydrolyzable groups are employed in the present invention because they are hydrolyzed by water and can produce polysiloxane by condensation. When m=1–3 in compounds represented by the aforementoned General Formula (1) they have an organic group (or organosilicon) described above and are employed in order introduce organic groups into the composite particles that are produced.

Concrete examples of compounds used in the present invention which are represented by General Formula (1) include the following.

Compounds of m=0 in Formula (1): tetraalkoxysilane compounds such as tetramethoxysilane, tetraethoxysilane, tetraisopropoxysilane, tetrabutoxysilane and dimethoxydiethoxysilane, etc.; and tetraacyloxysilane compounds such as tetraacetoxysilane, etc.

Compounds of m=1 in Formula (1): organotrialkoxysilane compounds and organotriacyloxysilane compounds such as methyltrimethoxysilane, methyltriethoxysilane, methyltripropoxysilane, methyltriisopropoxysilane, ethyltrimethoxysilane, ethyltriethoxysilane, propyltriethoxysilane, butyltriethoxysilane, vinyltrimethoxysilane, vinyltriethoxysilane, 3-glycidoxypropyltrimethoxysilane, 3-mercaptopropyltrimethoxysilane, 3-(2-aminoethylaminopropyl)trimethoxysilane, phenyltrimethoxysilane phenyltriethoxysilane, methyltriacetoxysilane and phenyltriacetoxysilane, etc.

Compounds of m=2 in Formula (1): diorganodialkoxysilane compounds, diorganodiacyloxysilane compounds, diorganosilanediol compounds, such as dimethoxydimethylsilane, diethoxy-3-glycidoxypropylmethylsilane, dimethoxydiphenylsilane, diacetoxydimethylsilane and diphenylsilanediol, etc.

Compounds of m=3 in Formula (1): triorganoaloxysilane compounds, triorganoacyloxysilane compounds, triorganosilanol compounds, such as trimethylmethoxysilane, trimethylethoxysilane, acetoxythylsilane and trimethylsilanol, etc.

Of the compounds represented by the aforementioned General Formula (1), organotrialkoxysilane compounds and tetraalkoxysilane compounds are preferred starting materials.

Derivatives of the compounds represented by the aforementioned General Formula (1) are other silicon compounds capable of hydrolysis and condensation. Examples include compounds in which some of the hydrolyzable groups are substitute by a carboxyl group, β-dicarbonyl group or other group which allow the formation of chelate compounds, or lowly condensed products obtained by partial hydrolysis and condensation of these silicon compounds or chelate compounds.

Silicon compounds capable of hydrolysis and condensation such as those described above can be employed as starting materials (here which mean members of metal compound capable of hydrolysis and condensation) singly, or in mixture of 2 or more types.

Of the aforementioned silicon compounds, only compounds selected from the group consisting of compounds of m=1 in Formula (1) and derivatives thereof can be used alone as the silicon compound; only in this case can the first embodiment of the composite particles of the present invention be obtained by employing a single compound.

When two or more of the aforementioned silicon compounds are used together, they need to include either or both of: a compound selected from the group consisting of compounds of m=1 in Formula (1) and their derivatives; and a compound selected from the group consisting of compounds of m=0 Formula (1) and their derivatives. Only in this case can the first embodiment of the composite particles of the present invention be obtained by using 2 or more compounds together. In this case, the proportions of silicon compounds (having values of m of 0, 1, 2 and 3 in General Formula (1) and their derivatives) are preferably decided to give n=0.5–1 in General Formula (6) below for the mean composition of the starting materials after mixing.

$$R'''_n Si(OR'''')_{4-n} \tag{6}$$

(In the formula, R''' indicates the mean composition of organic groups having carbon atoms directly combined with silicon atoms, and R'''' indicates the mean composition of at least one monovalent group selected from the group consisting of a hydrogen atom, alkyl groups and acyl groups.)

The first embodiment of the composite particles of the present invention cannot be obtained when at least one selected from the group consisting of silicon compounds having m=2 in Formula (1), silicon compounds having m=3 in Formula 1) and derivatives thereof is exclusively used as the starting material, or when at least one selected from the group consisting of silicon compounds having m=0 in Formula (1) and derivatives thereof is exclusively used as the starting material.

Silicon compounds capable of hydrolysis and condensation selected from compounds represented by the aforementioned General Formula (1) and derivatives thereof, which are starting materials for a polysiloxane component having organosilicon in its molecule described above, may be employed on their own as metallic compounds capable of hydrolysis and condensation employed to obtain the first embodiment of the composite particles of the present invention or a mixture of aforementioned silicon compounds capable of hydrolysis and condensation in the presence of other metal compounds capable of hydrolysis and condensation, selected from organic metal compounds of boron, aluminum, gallium, indium, phosphorus, titanium or zirconium, etc. or inorganic compounds, can be employed. The proportions of these compounds is preferably decided to give a proportion accounted for by the aforementioned polysiloxane in the composite particles of ≧70 wt %.

The metal compounds capable of hydrolysis and condensation as the starting materials described above are subjected to hydrolysis and condensation in a solution medium which includes water. A bulk, intermittent or continuous manner etc., can be adopted at will for hydrolysis and condensation. A catalyst such as ammonia, urea, ethanolamine, tetramethylammonium hydroxide, an alkali metal hydroxide or an alkaline earth metal hydroxide, etc., can be used for hydrolysis and condensation. An organic solvent can also be present in the solution medium in addition to water and a catalyst. Concrete examples of organic solvents include alcohols such as methanol, ethanol, isopropanol n-butanol, isobutanol, sec-butanol, t-butanol, pentanol, ethylene glycol, propylene glycol and butane-1,4-diol, etc., ketones such as acetone and methyl ethyl ketone, etc., esters such as ethyl acetate, etc., (cyclo)paraffins such as isooctane and cyclohexane, etc., ethers such as dioxane and diethyl ether, etc., and aromatic hydrocarbons such as benzene and toluene, etc., can be used singly or in mixtures.

Hydrolysis and condensation can be performed, for example, by adding the metal compounds capable of hydrolysis and condensation of the above starting materials, or a solution thereof in an organic solvent, to a solution medium which includes water, and stirring at a temperature in the range 0°–10° C., and preferably 0°–70° C., for 30 minutes to 100 hours.

Particles obtained by a process such as the above can also be loaded beforehand into the synthetic system as seed particles, at the seed particles can be grown by adding the starting materials.

By hydrolyzing and condensing metal compound starting materials capable of hydrolysis and condensation which include a silicon compound capable of hydrolysis and condensation, under suitable conditions in a solution medium including water in this way, a suspension is formed from which particles with a spherical shape and a very sharp particle diameter distribution separate out. As the suitable conditions here, for example a starting material concentration of ≧20 wt %, a water concentration of ≧50 wt %, and a catalyst concentration of ≧10 wt % of the suspension obtained are preferably used.

Particles having a mean particle diameter within the range of mean particle diameter for the first embodiment of the composite particles described above can be produced by setting the water concentration, catalyst concentration, organic solvent concentration and starting materials concentration, the period of time of adding the starting materials, temperature and the seed particle concentration to 50–99.99 wt %, 0.01–10 wt %, 0–50 wt %, 0.1–30 wt %, 0.001–500 hours, 0°–100° C. and 0–10 wt % respectively. Particles with a coefficient of variation in particle diameter within the above range for the coefficient of variation of mean particle diameter for the first embodiment of the composite particles described above can be produced by setting the water concentration, catalyst concentration and organic solvent concentration within the ranges above.

Next, the particles thus produced are isolated from the above suspension using a prior known method such as filtration, centrifugal separation or concentration at decreased pressure, etc., and heat treated at a temperature ≧100° C. and ≧1000° C., and preferably ≧300° C. and ≧900° C. in order to dry and calcine them, to obtain the particle body of the first embodiment of the organic-inorganic composite particles of the present invention. The main component of this particle body is polysiloxane which has in its molecule organosilicon in which at least one carbon atom in an organic group is directly and chemically combined with the silicon atom. With heat-treatment at a temperature lower than 100° C. condensation of silanol groups represented by the following Formula (7) present in the siloxane units indicated by the aforementioned Formula (5)

$$\begin{array}{c} | \\ -Si-OH \\ | \end{array} \tag{7}$$

with the elimination of water is inadequate, and consequently the necessary hardness is not obtained: thus, the elastic modulus in 10% compression does not become ≧350 kg/mm². Similarly, with heat treatment at a temperature higher than 1000° C. there is marked decomposition of the organic groups, and consequently the necessary mechanical resilience is not obtained: thus, the residual displacement after 10% deformation does not become 0–5%, and the elastic modulus in 10% compression also exceeds 3000 kg/mm². Moreover, although any atmosphere can be used for the heat treatment without restriction, in order to suppress decomposition of organic groups and obtain the needed mechanical resilience a concentration of oxygen in the atmosphere if ≧10% is preferred. When the temperature of heat treatment is in the range 350°–1000° C. the oxygen concentration in the atmosphere is preferably ≧10% in order to obtain the above first embodiment of the composite particles; and when the temperature of heat treatment is 100°–350° C. the above first embodiment of the composite particles is also produced in air.

With the process of the present invention the proportion of organic groups in the first embodiment of the composite particles can be chosen at will in the aforementioned range (the range described in explaining the first embodiment of the composite particles) by selecting the types and quantities of starting materials described above, the temperature and time of heat treatment, and the concentration of oxygen in the atmosphere.

When hydrolyzing, when condensing, or when heat-treating, other compounds which possess reactive groups as described above and can react and form chemical bonds with silicon compounds capable of hydrolysis and condensation can also be present. In this case, a prior known coloring compound such as a dye and/or pigment, for example, can also be present.

A prior known surface treatment, such as surface modification by means of a coupling agent, surface modification by means of a previously described organo-metallic compound or inorganic compound, or surface modification by means of another organic compound, can be carried out on the first embodiment of the composite particles obtained as above before employing them as spacers, in order to improve ease of dispersing spacers on the electrode substrate when used as spacers for liquid crystal displays, or to prevent the abnormal orientation of liquid crystals at the surface of the spacers, or to fix the composite particles on the surface of the electrode substrate so that they do not move, or for other purposes. For example, the method of surface treatment described in Japanese Unexamined Patent Publication (Kokai) 62-269933 can be adopted. In this specification, when silica gel particles made by the sol-gel method are used as liquid crystal display spacers the spacers are surface treated with an alcohol and/or a coupling agent, etc., in order to improve the ease of dispersing the spacers on the electrode substrate, or in order to suppress the production of abnormal liquid crystal orientation at the surface of the spacers.

The Si-C bonds and siloxane units in the particle body of the first embodiment of the composite particles of the present invention obtained can be confirmed by a prior known method such as FT-IR, NMR or ESCA, etc. and the proportion of the organic groups in the first embodiment of the composite particles, as the proportion accounted for by total carbon atoms, can be quantitatively determined by elemental analysis.

The condensation step can also be a step of hydrolysis and condensation using the aforementioned first silicon compound. The first silicon compound is at least one selected from the group consisting of compounds represented by General Formulae 2, 3 and 4 described above and their derivatives.

In the condensation step, both of the first and second silicon compounds described below can be used. The second silicon compound is at least one selected from the group consisting of compounds represented by the following General Formula (8) and their derivatives:

$$X_m R^{10}_n Si(OR^9)_{4-m-n} \tag{8}$$

where: X indicates a monovalent radical-polymerizable functional group indicated by $CH_2=C(-R^1)-COOR^2-$, $CH_2=C(-R^4)-$ or $CH_2=C(-R^6)-R^7-$; $R^1$, $R^4$ and $R^6$ indicate a hydrogen atom or a methyl group; $R^2$ and $R^4$ indicate an alkylene group of 1–10 carbon atoms, which may have a substituent group; $R^9$ indicates a hydrogen atom or at least one monovalent group selected from the group consisting of alkyl groups of 1–5 carbon atoms and acyl groups of 2–5 carbon atoms; $R^{10}$ indicates at least one monovalent group selected from the group consisting of alkyl groups of 1–10 carbon atoms and aryl groups of 6–10 carbon atoms, which may have a substituent group; m indicates an integer of 2–3; n indicates an integer of 0–2; and m+n indicates an integer of 2–3. The plural X may be different from each other, or 2 or more of X may be identical with each other. When n=2, the two $R^{10}$s may be either different from or identical with each other. When 4—m—n is 2, the two $R^9$s may be either different from or identical with each other.

The radical-polymerizable groups in General Formulae 2–4 and 8 are $CH_2=C(-R^1)-COOR^2-$, $CH_2=C(-R^4)-$ or $CH_2=C(-R^6)-R^7-$. In General Formula 8 when there are 2 or more radical-polymerizable groups, they may be mutually different or 2 or more may be mutually identical. Subjecting the radical-polymerizable groups to radical polymerization produces an organic polymer framework including the vinyl polymer described above. The radical-polymerizable group is an acryloxyalkyl group ($R^1$ in General Formulae 2 and 8 is a hydrogen atom), a methacryloxyalkyl group ($R^1$ in General Formulae 2 and 8 is a methyl group), a vinyl group ($R^4$ in General Formulae 3 and 8 is a hydrogen atom), an isopropenyl group ($R^4$ in General Formulae 3 and 8 is a methyl group), a 1-alkenyl group ($R^6$ in General Formulae 4 and 8 is a hydrogen atom), or an isoalkenyl group ($R^6$ in General Formulae 4 and 8 is a methyl group).

In General Formulae 2–4 and 8 the hydrolyzable groups are $R^3O$, $R^5O$, $R^8O$ and $R^9O$. Groups $R^3O$, $R^5O$, $R^8O$ and $R^9O$ are monovalent groups selected from the group consisting of a hydroxyl group, alkoxy groups of 1–5 carbon atoms and acyloxy groups of 2–5 carbon atoms. In General Formulae 2–4, the 3 $R^3O$ group, 3 $R^5O$ groups and 3 $R^8O$ groups may be mutually different or 2 or more may be mutually identical. In General Formula 8 when there are two $R^9O$ groups they may be mutually different or identical. On grounds of high speed of hydrolysis and condensation, the $R^3O$ groups, $R^5O$ groups, $R^8O$ groups and $R^9O$ groups are each preferably selected from the group consisting of a methoxy group, ethoxy group, propoxy group and acetoxy group; and methoxy groups and methoxy groups are more preferred. By hydrolyzing the $R^3O$ groups, $R^5O$ groups, $R^8O$ groups and $R^9O$ groups of first silicon compounds and second silicon compounds with water, and then condensing, a polysiloxane framework indicated by the aforementioned General Formula 5 is formed.

In General Formulae 2–4 and 8 the $R^2$ group and $R^7$ group are alkylene groups of 1–10 carbon atoms, which may have a substituent group. There are no particular restrictions as to these alkylene groups, but examples include an ethylene group, propylene group, butylene group, hexylene group and octylene group, etc. On grounds of ready availability, compounds having radical-polymerizable groups in which $R^2$ and $R^7$ are propylene groups are preferred.

In General Formula 8, the $R^{10}$ groups are an alkyl group or aryl group combined with the silicon atom. An alkyl group here is an alkyl group of 1–10 carbon atoms such as a methyl group, ethyl group, propyl group, butyl group or hexyl group, for example, which may have a substituent group. An aryl group here is an aryl group of 6–10 carbon atoms, for example a phenyl group or a tolyl group, etc. In General Formula 8, when there are two $R^{10}$ groups they may be mutually different or identical.

Compounds represented by at least one General Formula selected from the General Formulae 2, 3 and 4 have one silicon atom, and three hydrolyzable groups combined with the silicon atom, and one radical-polymerizable group combined with the silicon atom.

Concrete examples of compounds represented by General Formula 2 include γ-methacryloxypropyltrimethoxysilane, γ-methacryloxypropyltriethoxysilane, γ-acryloxypropyltrimethoxysilane, γ-acryloxypropyltriethoxysilane and γ-methacryloxypropyltriacetoxysilane, etc.; any one of these can employed on its own, or 2 or more can be used together.

Concrete examples of compounds represented by General Formula include vinyltrimethoxysilane, vinyltriethoxysilane and vinyltriacetoxysilane, etc.; any one of these can be employed on its own, or 2 or more can be used together.

Concrete examples of compounds represented by General Formula 4 include 1-hexenyltrimethoxysilane and 1-octenyltrimethoxysilane, etc.; any one of these can be employed on its own, or 2 or more can be used together.

A derivative of a compound represented by General Formula 2–4 is, for example, at least one selected from the group consisting of compounds in which some of the $R^3O$ groups in a compound represented by General Formulae 2–4 are substituted by a β-dicarbonyl group and/or another group which allows the formation of a chelate compound, and lowly condensed products obtained by partial hydrolysis and condensation of compounds represented by General Formulae 2–4 and/or chelate compounds thereof.

As first silicon compounds, compounds indicated by General Formula 2 are preferred on grounds of the ease of forming the second embodiment of the organic-inorganic composite particles with a sharp particle diameter distribution; and at least one selected from the group consisting of γ-methacryloxypropyltrimethoxysilane, γ-methacrylxypropyltriethoxysilane, γ-acryloxypropyltrimethoxysilane, γ-acryloxypropyltriethoxysilane and γ-methacryloxypropyltriacetoxysilane is particularly preferred.

The following 5 classes of compounds are represented by General Formula 8.

(1) Compounds which have one silicon atom, and one radical-polymerizable group combined with the silicon atom, and one alkyl group or aryl group combined with the silicon atom, and two hydrolyzable groups combined with the silicon atom (m=1, n=1). Concrete examples of such compounds include γ-methacryloxypropylmethyldimethoxysilane, γ-methacryloxypropylmethyldiethoxysilane, γ-acryloxypropylmethyldimethoxysilane, γ-acryloxypropylmethyldiethoxysilane, vinylmethyldimethoxysilane and vinylmethyldiethoxysilane, etc.; any one of these can be employed on its own, or 2 or more can be used together.

(2) Compounds having one silicon atom, and one radical-polymerizable group combined with the silicon atom, and two alkyl and/or aryl groups combined with the silicon atom and one hydrolyzable group combined with the silicon atom (m=1, n=2). Concrete examples of such compounds include γ-methacryloxypropyldimethylmethoxysilane, γ-methacryloxypropyldimethylethoxysilane, γ-acryloxypropyldimethoxysilane, γ-acryloxypropyldimethylethoxysilane and vinyldimethylmethoxysilane, etc.; any one of these can be employed on its own, or 2 or more can be used together.

(3) having one silicon atom, and two radical-polymerizable groups combined with the silicon atom, and two hydrolyzable groups combined with the silicon atom (m=2, n=0). Concrete examples of such compounds include bis-(γ-acryloxypropyl)dimethoxysilane and bis(γ-methacryloxypropyl)dimethoxysilane, etc.; any one of these can be employed on its own, or 2 or more can be used together.

(4) Compounds having one silicon atom, and two radical-polymerizable groups combined with the silicon atom, and one alkyl group or aryl group combined with the silicon atom, and hydrolyzable group combined with the silicon atom (m=2, n=1). Concrete examples of such compounds include bis(γ-methacryloxypropyl)methylmethoxysilane, bis(γ-acryloxypropyl)methylmethoxysilane, etc.; any one of these can be employed on its own, or 2 or more can be used together.

(5) Compounds having one silicon atom, and 3 radical-polymer polymerizable groups combined with the silicon atom, and one hydrolyzable group combined with the silicon atom (m=3, n=C). Concrete examples of such compounds include tris(γ-methacryloxypropyl)methoxysilane, tris(γ-acryloxypropyl)methoxysilane, etc.; any one of these can be employed on its own, or 2 or more can be used together.

As a second silicon compound, a compound represented by General Formula 8 in which the radical-polymerizable group(s) in the compound is/are a $CH_2=C(-R^1)-COOR^2-$ group is preferred or grounds of the ease of forming the second embodiment of the organic-inorganic composite particles which have a sharp particle diameter distribution.

A derivative of a compound represented by General Formula 8 is, for example, at least one selected from the group consisting of compounds in which some of the $R^9O$ groups in compounds represented by General Formula 8 are substituted by a β-dicarbonyl group and/or another group which allows the formation of a chelate compound, and lowly condensed products obtained by partial hydrolysis and condensation of compounds represented by General Formula 8 and/or chelate compounds thereof.

The first silicon compound is needed in the present invention because the particles obtained when a second silicon compound is hydrolyzed and condensed without using a first silicon compound tend to have low hardness.

Other than the first and second silicon compounds described above, at least one metal compound capable of being hydrolyzed and condensed, selected from the group consisting of silane compounds represented by General Formula (9) below, and their derivatives, and organic metal compounds and inorganic metal compounds of boron, aluminum, gallium, indium, phosphorus, titanium and/or zirconium, etc., can also be used concurrently in order to obtain the second embodiment of the organic-inorganic composite particles of the present invention.

$$R^{12}{}_p Si(OR^{11})_{4-p} \qquad (9)$$

(In the formula, $R^{11}$ is the same as $R^3$, $R^{12}$ is the same as $R^{10}$, and p is 0 or 1.)

On grounds of speed of hydrolysis and condensation the $R^{11}$ group of the silane compound represented by General Formula 9 is preferably a methyl group or an ethyl group. p is 0 or 1, but on grounds of being able to give high hardness in the second embodiment of the organic-inorganic composite particles p is preferably 0.

A derivative of a silane compound represented by General Formula 9 is, for example, at least one selected from the group consisting of compounds in which some of the $R^{11}O$ groups in compounds represented by General Formula 9 are substituted by a β-dicarbonyl group and/or another group which allow the formation of a chelate compound, and lowly condensed products obtained by partial hydrolysis and condensation of compounds represented by General Formula 9 and/or chelate compounds thereof.

There are no particular restrictions as to the quantity of metal compounds capable of hydrolysis and condensation other than the first and second silicon compounds, but if large quantities are employed the shape of the organic-inorganic composite particles obtained may not be spherical and particle diameter distribution may be broadened making them unsuitable as spacers. Consequently, the quantity of metal compounds capable of hydrolysis and condensation other than the first and second silicon compounds preferably $\geq 200$ wt %, more preferably $\geq 100$ wt %, and even more preferably $\geq 50$ wt %, of the total weight of first and second silicon compounds.

The first silicon compound, and optionally employed second silicon compound and/or metal compound capable of hydrolysis and condensation, (termed "starting materials" hereafter) is/are subjected to hydrolysis and condensation in a solution medium containing water; a bulk, intermittent or continuous manner, etc., can be adopted at will for the hydrolysis and condensation. A catalyst such as ammonia, urea, ethanolamine, tetramethylammonium hydroxide, an alkali metal hydroxide or an alkaline earth hydroxide, etc., can be used for bringing about hydrolysis and condensation. An organic solvent may also be present in the solution medium in addition to water and a catalyst. Concrete examples of organic solvents include alcohols such as methanol, ethanol, isopropanol, n-butanol, isobutanol, sec-butanol, t-butanol, pentanol, ethylene glycol and 1,4-butanediol, etc., ketones such as acetone and methyl ethyl ketone, esters such as ethyl acetate, (cyclo)paraffins such as isooctane and cyclohexane, etc., ethers such as dioxane and diethyl ether and aromatic hydrocarbons such as benzene and toluene, etc., used singly or in mixtures.

Hydrolysis and condensation can be performed, for example, by adding the starting materials above, or a solution thereof in an organic solvent, to a solution medium including water, and stirring at a temperature in the range 0°–100° C., and preferably 0°–70° C., for 30 minutes to 100 hours.

Particles obtained by a process such as that above can also be loaded beforehand into the synthetic system as seed particles, and then the seed particles can be grown by adding the starting materials.

By hydrolyzing and condensing the starting materials under suitable conditions in a solution medium including water in this way, a slurry is produced from which the particles separate out. The particles which separate out are the resulting product of hydrolysis and condensation of a silicon compound described above which has a radical-polymerizable group, and the particles have an optionally selected particle diameter $\geq 0.5$ μm, and a sharp particle diameter distribution. As the suitable conditions here, a starting material concentration in the slurry of $\geq 20$ wt %, a water concentration of $\geq 50$ wt % and a catalyst concentration of $\geq 10$ wt % are preferably used.

Particles which have a mean particle diameter within the above range for particle diameter possessed by the second embodiment of the organic-inorganic composite particles of the present invention described above can be produced by hydrolysis and condensation by setting the water concentration, the catalyst concentration, the organic solvent concentration, the starting material concentration, the period of time of adding the starting materials, the temperature and seed particle concentration, for example, to 50–99.99%, 0.01–10 wt %, 0–90 wt %, 0.1–30 wt %, 0.001–500 hours, 0°–100° C. and 0–10 wt % respectively. By setting the water concentration, catalyst concentration and organic solvent concentration within the respective ranges above, particles can be produced which have a coefficient of variation in particle diameter within the range for the organic-inorganic composite particles of the present invention described above.

Moreover, in hydrolyzing and condensing a first silicon compound, and an optionally employed second silicon compound and/or metal compound capable of hydrolysis and condensation, fine inorganic particles of a mean particle diameter $\geq 0.4$ μm are preferably also used. The reason is that the organic-inorganic composite particles obtained are harder and have a raised fracture strength when they include fine inorganic particles chemically combined with the polysiloxane framework.

Concrete examples of fine inorganic particles include silica, alumina, aluminum hydroxide, titanium oxide and zirconium oxide, etc.; but on grounds of ease of introduction into particles obtained by hydrolysis and condensation, silica is preferred.

A mean particle diameter of the fine inorganic particles exceeding 0.4 μm is undesirable because it becomes difficult to introduce them into particles obtained by hydrolysis and condensation of the starting materials. Therefore, the smaller the mean particle diameter of the fine inorganic particles the better, and it is preferably $\geq 0.1$ μm, more preferably $\geq 30$ nm, and even more preferably $\geq 10$ nm. The fine inorganic particles are preferably silica of mean particle diameter of preferably $\geq 0.1$ μm, more preferably $\geq 30$ nm or $\geq 10$ nm.

On grounds of decreasing the number of particle aggregates, these fine inorganic particles are preferably of sol dispersed in water or an organic solvent. More preferably they are of sol of fine inorganic particles of a mean particle diameter $\geq 30$ nm, and even more preferably $\geq 1$ 0 nm. Concrete examples include, for example, sols of silica particles of mean particle diameter $\geq 30$ nm (silica sols) such as "Snowtex 20", "Snowtex 0", "Snowtex C", "Snowtex N", "Snowtex S", "Snowtex 20L", "Snowtex XS", "Snowtex XL", "Snowtex YL", "Snowtex ZL", "Methanol Silica Sol" and "PA-ST" (trade names, made by Nissan Chemical Industries, Ltd.), etc., and alumina sols such as "Alumina Sol 100", "Alumina Sol 200" and "Alumina Sol 520" (trade names, made by Nissan Chemical Industries, Ltd.), etc.

During the condensation step, and/or after the condensation step, the radical-polymerizable groups are subjected to radical polymerization. Thus, particles of an intermediate product obtained by hydrolysis and condensation of a first silicon compound, optionally employing a second silicon compound, are subjected to radical polymerization. The radical-polymerizable groups undergo radical polymerization to form an organic polymer framework.

As the method of radical polymerization, radical polymerization can be performed as it stands by dissolving a water-soluble or oil-soluble radical polymerization initiator the slurry of a solution medium including water which contains the particles obtained by hydrolysis and condensation or the particles obtained by hydrolysis and condensation can be isolated from the slurry using a known method such as filtration, centrifugal separation or concentration at decreased pressure, etc., and then polymerized by dispersion in a solution of water or an organic solution medium, etc., containing a polymerization initiator; however, these are not the only possible methods. Performing hydrolysis and condensation in the presence of a polymerization initiator so that radical polymerization occurs simultaneously is particularly preferred. The reason is that because the organic polymer is produced by polymerization in parallel with the production of polysiloxane shown by Formula 5, it is easier to obtain the hardness characteristic of inorganic substances and the mechanical resilience and fracture strength characteristic of organic polymers which are possessed by the second embodiment of the organic-inorganic composite particles of the present invention, and the resulting particles express this hardness, mechanical resilience and fracture strength to particular advantage.

There are no particular restrictions as to the radical polymerization initiator here, and a prior known substance can be employed; but at least one selected from the group consisting of azo compounds and peroxy compounds is preferred.

There are no particular restrictions as to the quantity of the radical polymerization initiator above; but since if too much is used a lot of heat is generated and it becomes difficult to control the reaction, and if too little is used radical polymerization may not proceed, for example, it will be in the range 0.1–5 wt %, and preferably 0.3–2 wt %, relative to the total weight of first and second silicon compounds.

The temperature for radical polymerization can be selected to suit the radical polymerization initiator that is employed, but to facilitate control of the reaction it will be in the range 30°–100° C., and preferably 50°–80° C.

Monomers having groups capable of radical polymerization with the radical-polymerizable groups can also be present when carrying out radical polymerization. Examples of monomers include unsaturated carboxylic acids such as acrylic acid and methacrylic acid, etc., esters of unsaturated carboxylic acids such as acrylic acid esters, methacrylic acid esters, crotonic acid esters, itaconic acid esters, maleic acid esters and fumaric acid esters, etc., acrylamides, methacrylamides, vinyl compounds such as aromatic vinyl compounds such as styrene, α-methylstyrene and divinyl benzene, etc., vinyl esters such as vinyl acetate, etc., and halogenated vinyl compounds such as vinyl chloride, etc.; one or more of these can be employed. Of these, monomers which have 2 or more groups capable of radical polymerization, such as divinylbenzene, trimethylolpropane trimethacrylate and ethylene glycol dimethacrylate, etc., are preferred.

However, if too much monomer is employed and the polysiloxane content in the organic-inorganic composite particles becomes less than 25 wt %, hardness becomes inadequate, which is undesirable. Consequently, the quantity of monomers is, for example, 0–50 wt %, and preferably 0–30 wt %, of the total weight of first and second silicon compounds.

After radical polymerization, the further recondensation step described below is preferably carried out, since it raises the hardness, mechanical resilience and fracture strength of the organic-inorganic particles that are finally obtained. The recondensation step includes subjecting the polymerized particles (which are produced by the radical polymerization) to further condensation in an organic solvent. In order to speed up condensation the aforementioned catalysts can be used; catalysts preferred on grounds of speeding up condensation include organic titanium compounds such as titanium tetraisopropoxide, titanium tetrabutoxide and diisopropoxy-bis(acetylacetonate) titanate, etc., organic aluminum compounds such as aluminum triisopropoxide, aluminum tri(sec-butoxide), aluminum tris(acetylacetonate) and aluminum isopropoxide-bis(acetylacetonate), etc., organic zirconium compounds such as zirconium tetrabutoxide and zirconium tetrakis(acetylacetonate), etc., organic tin compounds such as dibutyltin diacetate, butyltin dilaurate, dibutyltin diethylhexanoate and dibutyltin dimaleate, etc., and acidic phosphate esters such as $(CH_3O)_2P(=O)OH$, $(CH_3O)P(=O)(OH)_2$, $(C_4H_9O)_2P(=O)OH$ and $(C_8H_{17}O)P(=O)(OH)_2$, etc.; any one of these can be used on its own or two or more can be used together. Of these, at least one selected from the group consisting of organotin compounds and acidic phosphate esters is preferred.

In the recondensation step, it is preferable that the polymerized particles do not contain water. The reason for this is to facilitate the progress of condensation of silanol groups with the elimination of water. Therefore, when the slurry obtained by the polymerization step does not contain water the slurry can be employed as it stands in the recondensation step, but when the slurry contains water the polymerized particles are preferably isolated from the slurry using a prior known method such as filtration, centrifugal separation or concentration at decreased pressure, and then dispersed in an organic solvent before recondensation. The organic solvents employed will be, for example, at least one selected from the group consisting of the alcohols, ketones, esters, paraffins, ethers and aromatic hydrocarbons mentioned previously. The recondensation step can be performed, for example, by stirring an organic solvent slurry containing the polymerized particles at a temperature of 50°–200° C., and preferably 60°–150° C., for 30 minutes to 100 hours. The pressure can be normal pressure, decreased pressure or increased pressure.

By isolating the polymerized particles produced by radical polymerization from the slurry using a prior known method such as filtration, centrifugal separation or concentration at decreased pressure, etc., and then heat-treating them at a temperature of $\geq 800°$ C., preferably a temperature of 100°–600° C., and more preferably a temperature of 150°–500° C. in order to dry and calcine them, the second embodiment of the organic-inorganic composite particles of the present invention is obtained which possess suitable hardness, mechanical resilience and fracture strength. These composite particles include as their main components an organic polymer framework, and a polysiloxane framework which has in its molecule organosilicon in which the silicon atom is directly and chemically combined with at least one carbon atom in the organic polymer framework. However, with heat treatment at a low-temperature the condensation of silanol groups represented by Formula 7 present in the siloxane units indicated by Formula 5 is incomplete, and consequently the necessary hardness is not obtained. Thus, the elastic modulus in 10% compression of the particles may not attain $\geq 350$ kg/mm$^2$. Similarly, with heat treatment at a temperature higher than 800° C. there is marked decomposition of the organic polymer, and consequently the necessary mechanical resilience and fracture strength are not obtained. Thus, the residual displacement of the particles after 10% deformation does not attain 0–5%; and the particles become too hard, with an elastic modulus in 10% compression in excess of 3000 kg/mm$^2$. Moreover, although there are no restrictions as to the atmosphere used for heat treatment, in order to suppress decomposition of the organic polymer and obtain the necessary mechanical resilience an oxygen concentration of $\geq 10$ vol % in the atmosphere is preferable. In order to obtain the second embodiment of the organic-inorganic composite particles of the present invention oxygen concentration in the atmosphere at heat treatment is preferably $\geq 10$ vol % when the temperature of heat treatment is in the range 200°–800° C., but when the temperature of heat treatment is $\geq 200°$ C. the second embodiment of the organic-inorganic composite particles of the present invention can also be obtained in air.

By appropriate selection of the types and/or quantities of the starting materials, fine inorganic particles, water and catalyst for hydrolysis and condensation and monomers and radical polymerization initiator described above, the temperature and period of time of heat treatment and the oxygen concentration in the atmosphere when making the second embodiment of the organic-inorganic composite particles, the quantity of $SiO_2$ in the polysiloxane framework of the organic-inorganic composite particles obtained can be controlled at will at $\geq 25$ wt %, and the mean particle diameter can be controlled at will at $\geq 0.5$ μm.

Since the process of the present invention for producing the second embodiment of the organic-inorganic composite particles includes the condensation step, the hydrolysis step and the heat-treatment step described above, the polysiloxane framework and the organic polymer framework have a structure chemically combined by Si-C bonds, and organic-inorganic composite particles can be produced which have the great hardness characteristic of the polysiloxane 3-dimensional framework and the high mechanical resilience and fracture strength characteristic of the polymer framework. Consequently, the composite particles obtained have the mechanical resilience necessary to maintain a constant gap distance between a pair of members which should be placed with a proper gap distance, and the hardness and fracture strength to maintain the aforementioned gap distance with smaller numbers, and they also do not readily cause physical damage to the members. Moreover, since the composite particles have a mean particle diameter $\geq 0.5$ μm, they are useful for forming a gap distance between a pair of members.

Colored organic-inorganic composite particles can be obtained by coloring the particles produced during and/or after at least one step selected from the group consisting of the condensation step, the polymerization step, the recondensation step and the heat-treatment step.

In the process of the present invention, colored organic-inorganic composite particles can be produced by introducing a dye and/or pigment into the particles by having a dye and/or pigment present in a suitable step during manufacture.

Within the process of the present invention the particles are preferably colored by using a dye and/or pigment the condensation step. As dyes and/or pigments, those mentioned above can be cited. Of these, basic dyes are preferred. This is because the silanol groups in polysiloxane are acidic, and basic (cationic) dyes are readily absorbed so that coloring is easy. Examples of pigments include inorganic pigments such as carbon black, iron black, chrome vermillion, molybdenum red, red ochre, yellow lead, chrome green, cobalt green, ultramarine blue and iron blue, etc., and organic pigments such as phthalocyanine, azo and quinacridone pigments, etc. However, since it may not be possible to introduce pigments into the composite particles of the present invention if the mean particle diameter thereof is not $\geq 0.4$ μm, the use of dyes is preferred. Organic-inorganic composite particles of the present invention which are colored in this way are particularly useful for raising the picture quality of liquid crystal displays because they are also provided with the aforementioned hardness, mechanical resilience and fracture strength.

Organic-inorganic composite particles of the present invention also have a particle body described above and a conductive layer formed on the surface of the particle body.

The particle body of organic-inorganic composite particles of the present invention has the mechanical resilience necessary to maintain constant the gap distance between a pair of electrodes brought into electrical contact, and the hardness and fracture strength to maintain the aforementioned gap distance constant with smaller numbers; and they also do not readily cause physical damage to the electrodes. Consequently, it is easy to maintain the gap distance between a pair of electrodes constant, and to avoid detachment and falling off of the conductive layer due to pressure which causes short circuit between the electrodes when they should not be in electrical contact and poor contact between the electrodes when they should be in electrical contact.

Metals employed in the conductive layer can be prior known metals: examples include nickel, gold, silver, copper and indium, and alloys of these, etc.; nickel, gold and indium are preferred, since they have particularly high conductivity. There are no particular restrictions as to the thickness of the conductive layer, provided that it gives conduction; but it is preferably in the range 0.01–5 μm, and particularly preferably in the range 0.02–2 μm. When the thickness is thinner than the aforementioned range conductivity may be inadequate, and when it is thicker than the aforementioned range the conductive layer becomes prone to detach due to the difference in thermal conductivity between the particle and the conductive layer. The conductive layer can be a single layer or $\geq 2$ layers; when there are $\geq 2$ layers, layers including different conductors an be arranged one on top of the other.

A prior known method can be adopted as the method for forming a conducting layer on the surface of the particle body of organic-inorganic composite particles of the present invention; there are no particular restrictions, and a method such as a chemical plating method (electroless plating), a coating method, a PVD method (vacuum vapor deposition, sputtering, ion plating, etc.) etc., for example, can be used; of these chemical plating is preferred since it readily gives conductive particles of the present invention. Conductive particles of the present invention so obtained are also provided with the hardness and mechanical resilience of organic-inorganic composite particles of the present invention described above. Consequently, they are particularly useful as electrical connecting materials for electronics applications such as liquid crystal displays, LSIs and printed circuit boards, etc.

Organic-inorganic composite particles of the present invention have the mechanical resilience necessary to maintain a constant gap distance between a pair of electrode substrates which should be arranged with the correct gap distance between them, and the hardness and fracture strength necessary to maintain the aforementioned gap distance constant with smaller numbers; and they also do not readily cause physical damage to the electrode substrates. Consequently, it becomes easy to maintain a constant gap distance between a pair of electrode substrates, in low-temperature environments shrinkage approaches that of the liquid crystals, vapor deposition layers, orientating layers and coating layers do not readily get damaged, and the number that needs to be dispersed between the electrode substrates is decreased.

As described above, because the first and second embodiments of the organic-inorganic composite particles of the present invention contain both of a polysiloxane framework and an organic group, or both of a polysiloxane framework and an organic polymer framework, or all of a polysiloxane framework, an organic group and an organic polymer framework together, and are composite particles in which the organic polymer framework and the polysiloxane framework are chemically combined, they are provided both with the great hardness characteristic of inorganic substances and with the high mechanical resilience and fracture strength characteristic of organic groups and/or organic polymers, and are ideal for use as spacers for liquid crystal displays.

When the organic-inorganic composite particles of the present invention are colored by including a dye and/or pigment in the particle body they are useful as colored spacers.

In liquid crystal displays an image is formed by applying a voltage between electrode substrates and producing change in the optical properties of the liquid crystals. In this connection, the spacers do not show any change in optical properties as the result of applying a voltage. Therefore, in the dark area of the portions when an image was displayed spacers which are not colored may allow light of the backlight lamp to escape and be recognizable as bright spots, and image contrast may be lowered.

When the organic-inorganic composite particles of the present invention have a particle body that has been colored by including a dye and/or pigment, light of the backlight lamp does not readily escape and the lowering of image contrast is prevented; since these composite particles are moreover also provided with a combination of characteristic hardness, mechanical resilience and fracture strength, they are particularly useful for improving the image quality of liquid crystal displays. The colors preferred for colored spacers for liquid crystal displays are colors which do not readily transmit light or which do not transmit light. Examples include black, dark blue, purple, blue, dark green, green, brown and red, etc., but black, dark blue and navy blue are particularly preferred.

The organic-inorganic composite particles of the present invention are also useful as adhesive spacers when they include a particle body and an adhesive layer formed on the surface of the particle body. The adhesive layer, for example, can be an adhesive which becomes adhesive when heated.

When the composite particles of the present invention have an adhesive layer on the surface of the particle body, on being interposed between electrode substrates which constitute a liquid crystal display and being hot pressed the adhesive layer will melt and stick to the electrode substrate, and they can be fixed in place by cooling and hardening the adhesive layer. Consequently, since the composite particles become unable to move freely it is possible to prevent damage to orientating layers and to maintain the uniformity of the gap distance, and it is possible to achieve an improvement in image quality. As an adhesive layer a thermoplastic resin is preferred. The glass transition temperature of the thermoplastic resin is preferably $\geq 150°$ C., and more preferably $\geq 80°$ C. This is so that it can be stuck to the electrode substrates by hot pressing for a short time. When the glass transition temperature is too high the adhesive layer may not stick to the electrode substrate when heated, and when it is too low the composite particles are liable to stick together; hence, it is most preferably in the range $40°$–$80°$ C. There are no particular restrictions as to the type of thermoplastic resin, but it is preferably a (meth)acrylic resin. The adhesive layer can be a single layer or it can be $\geq 2$ layers, and when it is $\geq 2$ layers it can be made up of layers of different thermoplastic resins on top of one another.

Composite particles having an adhesive layer can be obtained, for example, by coating the particle body of organic-inorganic composite particles of the present invention with an adhesive layer. When a thermoplastic resin is used as the adhesive layer, a layer of thermoplastic adhesive can be coated onto the surface of organic-organic composite particles of the present invention by a prior known resin coating method such as in-situ polymerization, coacervation, interface polymerization, a liquid curing coating method, a liquid drying method, a high speed gas stream impact method, a gas spray coating or a spray drying method, etc. High-speed gas stream impact methods are preferred because coating is easier. A high-speed gas stream impact method, for example, involves mixing organic-inorganic composite particles of the present invention with a powdered thermoplastic resin, dispersing this mixture in a gas phase, applying to the composite particles and the powdered thermoplastic resin mechanical and thermal energy the main component of which is an impact force, and coating the surface of the organic-inorganic composite particles with the thermoplastic resin; this method is preferred because of the ease of coating.

Equipment employing such high-speed gas stream impact methods include the Hybridization System manufactured by Nara Kikai Seisakusho KK, the Mechanofusion System manufactured by Hosokawa Mikron KK, and the Kryptron System manufactured by Kawasaki Jukogyo KK [Kawasaki Heavy Industry], etc.

Composite particles having an adhesive coating are furnished with the hardness, mechanical resilience and fracture strength of organic-inorganic composite particles of the sent invention described above, and have an adhesive coating; and hence they are particularly useful for improving the image quality of liquid crystal displays.

When composite particles having an adhesive layer are colored by including a dye and/or pigment in the particle body of organic-inorganic composite particles they do not readily allow light of the backlight lamp to escape and prevent a lowering of image contrast, and because they are adhesive they are not freely mobile, which prevents damage to orientating layers and enable a uniform gap distant to be maintained since moreover they combine the hardness, mechanical resilience and fracture strength characteristic of the present invention described above, the adhesive spacers are also useful as colored spacers, and therefore particularly useful for improving the picture quality of liquid crystal displays.

In liquid crystal displays of the present invention the composite particles of the present invention as described above are interposed between electrode substrates as spacers for the liquid crystal display instead of the prior spacers in prior liquid crystal displays; and they have a gap distance the same as the particle diameter of the composite particles, or almost the same. The quantity of composite particles employed is ordinarily 40–100/mm$^2$, and preferably 40–80/mm$^2$ which is of the order of 10–50% less than for prior organic spacers so that the area of the portions in which no image is formed becomes smaller and the quantity of impurities such as ions and molecules, etc., eluting from the inside of the spacers into the liquid crystal layer is greatly decreased. Consequently a high contrast, decrease in image roughness and an improvement in the picture quality can be expected.

Liquid displays of the present invention are provided, for example, with the first electrode substrate, the second electrode substrate, a sealing material, and a spacer for the liquid crystal display, and a liquid crystal. The first electrode substrate has a first substrate and a first electrode formed in the surface of the first substrate. The second electrode substrate has a second substrate and a second electrode formed in the surface of the second substrate and is opposite to the first electrode substrate. The spacers for the liquid crystal display, which are interposed between the first electrode substrate and the second electrode substrate, are composite particles of the present invention. A sealing material bonds the first electrode substrate with the second electrode substrate at their respective circumferencial edges. The liquid crystals are packed into the space defined by the first electrode substrate, the second electrode substrate and the sealing material.

In the liquid crystal displays of the present invention members other than the spacers, such as the electrode substrates, the sealing material and the liquid crystals can be the same materials employed in the same way as in prior liquid crystal displays. The electrode substrates include a substrate which is a glass sheet or a film sheet, etc., and an electrode formed in the surface of the substrate, and if necessary further have an orientating layer on the surface of the electrode substrate, formed so as to cover the electrode. As the sealing material an epoxy resin binder sealing material, etc., can be employed. The liquid crystals can be liquid crystals used in prior displays; for example, biphenyl, phenylcyclohexane, Schiff base, azo, azoxy, benzoic acid ester, terphenyl, cyclohexylcarboxylic acid ester, biphenylcyclohexane, pyrimidine, dioxane, cyclohexylcyclohexane ester, cyclohexylethane or cyclohexene type liquid crystals, etc.

One method for making a liquid crystal display of the present invention, for example, involves dispersing composite particles of the present invention evenly by a wet method or a dry method on one of the two electrode substrates as surface spacers, and then mounting the other electrode substrate, which has the portion to be sealed painted by a means such as screen printing with composite particles of the present invention as spacers for the sealed portion dispersed in a binder sealing material such as an epoxy resin, on top, and after heat curing the sealing binder material by applying a suitable pressure and heating at a temperature of 100°–180° for 1–60 minutes, or exposing to a quantity of ultraviolet radiation of 40–300 mJ/cm², injecting the liquid crystals, and then sealing the portion through which they are injected to obtain a liquid crystal display; but there are no restrictions in the present invention as to the method for making the liquid crystal display. Of the composite particles of the present invention, the aforementioned colored composite particles are preferred as surface spacers because they are not prone to allow light of the backlight lamp to escape, and the aforementioned composite particles having an adhesive layer are more preferred because they stick to the electrode substrates so that they cannot move freely; colored composite particles having an adhesive layer are even more preferred because they do not allow light of the backlight lamp to escape and they stick to the electrode substrates so that they cannot move freely.

Liquid crystal displays of the present invention can be employed for the same purposes as prior liquid crystal displays, as image display elements for televisions, personal computers and word processors, etc.

DESCRIPTION OF THE PREFERRED EMBODIMENTS

Hereinafter, the present invention is illustrated by the following examples of some preferred embodiments in comparison with comparative examples not according to the invention.

The liquid crystal displays in the Examples below were made by the process described below. As shown in FIG. 1, a lower electrode substrate 110 was first obtained by forming an electrode (for example, a transparent electrode) 5 and a polyimide orientating layer 4 on a lower glass substrate 11 of size 300 mm×345 mm×1.1 mm, and then rubbing. The spacers for the liquid crystal display (in this case surface spacers) 8, dispersed at 1 wt % in a mixed solvent including methanol 30 parts (v/v), isopropanol 20 parts (v/v and water 50 parts (v/v) were spread over 1–10 seconds on this lower electrode substrate 110.

Meanwhile, an upper electrode substrate 120 was obtained by forming an electrode (for example a transparent electrode) 5 and a polyimide orientating layer 4 on an upper glass substrate 12 of size 300 mm×345 mm×1.1 mm, and then rubbing. And spacers for the liquid crystal display (in this case sealing spacers) 3 dispersed at 30 vol % in an epoxy resin binder sealing material 2 were screen printed onto the portion of the upper electrode substrate 120 that was to be sealed.

Finally, the upper and lower electrode substrates 120 and 110 are stuck together with the electrodes 5 and orientating layers 4 opposite to each other and the spacers 8 between; a pressure of 4 kg/cm² was applied, and the binder sealing material 2 was heat cured by heating at 150° C. for 30 minutes. Then, by placing the space between the two electrode substrates 120 and 110 under vacuum and then returning it to atmospheric pressure, liquid crystals 7, including mixture of biphenyl and phenylcyclohexane type liquid crystals, etc., according to the type of liquid crystal display being made, were injected and the portion through which they were injected was sealed. PVA (poly(vinyl alcohol)) polarizing films 6 were then stuck to the outside of the upper and lower glass substrates 12 and 11, to constitute the liquid crystal display.

Figure 2:
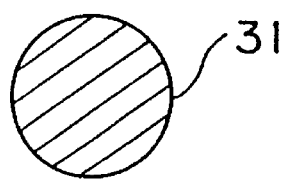
FIG. 2 is a cross-sectional diagram of an embodiment of an organic-inorganic composite particle of the present invention.

As FIG. 2 shows, the spacers 8 can be organic-inorganic composite particles of the present invention including an uncolored particle body 31. In this case, physical damage is not readily caused to the electrode substrates by pressure during manufacture, and the display is not prone to occur low-temperature bubbling or image unevenness. Moreover, because the number of spacers is less than with prior spacers including polymer particles, the area of the portion in which no image is formed is decreased and the elution of impurities into the liquid crystals is also decreased. Consequently, it is possible to raise contrast and raise picture quality.

Figure 3:
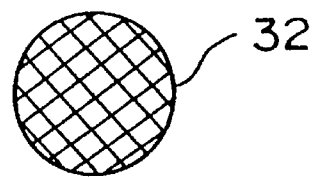
FIG. 3 is a cross-sectional diagram of an embodiment of an organic-inorganic composite particle of the present invention.

As FIG. 3 shows, the spacers 8 can also be organic-inorganic composite particles of the present invention including a colored particle body 32. In this case there is the additional advantage that transmission of light of the backlight lamp through the spacers 8 does not readily occur, and hence conspicuous bright spots are eliminated and the quality of the pictures displayed is further raised.

Figure 4:
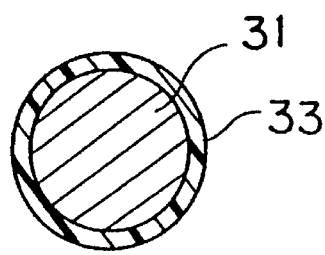
FIG. 4 is a cross-sectional diagram of an embodiment of an organic-inorganic composite particle of the present invention.

As FIG. 4 shows, the spacers 8 can also be organic-inorganic site particles of the present invention which include uncolored particle body 31 and an adhesive layer 33 formed on the surface of the particle body 31. In this case, there is the additional advantage that damage to the orientating layer is prevented because the spacers are not able to move freely, further raising the quality of the pictures displayed.

Figure 5:
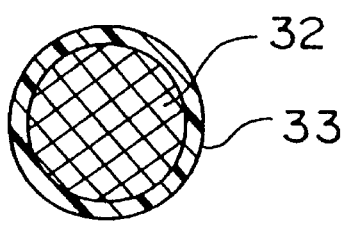
FIG. 5 is a cross-sectional diagram of an embodiment of an organic-inorganic composite particle of the present invention.

As FIG. 5 shows, the spacers 8 can also be organic-inorganic composite particles of the present invention which include a colored particle body 32 and an adhesive layer 33 formed on the surface of the particle body 32. In this case there is the additional advantage that transmission of light of the backlight lamp through the spacers 8 does not readily occur, eliminating conspicuous bright spots, and the additional advantage that damage to the orientating layer is prevented because the spacers are not able to move freely, further raising the quality of the pictures displayed.

Figure 6:
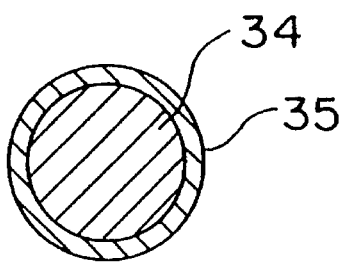
FIG. 6 is a cross-sectional diagram of an embodiment of an organic-inorganic composite particle of the present invention.

As FIG. 6 shows, the organic-inorganic composite particles of the present invention can also include a particle body 34 and a conductive layer 35 formed on the surface of the particle body 34. The conductive layer can be, for example, a metal layer formed by electroless coating, and can be one or more layers.

In relation to the methods for evaluating the liquid crystal displays obtained, low-temperature bubbling was assessed by the presence or absence of an image after holding for 1000 hours at −45° C., and the presence or absence of image unevenness and pixel faults was assessed visually room temperature (25° C.).

EXAMPLE A1

Methanol (307 parts by weight), 25% aqueous ammonia (6 parts by weight) and water (1225 parts by weight) were mixed evenly in a 2-liter glass reaction vessel provided with a stirrer, a dropping funnel and a thermometer. This mixture was adjusted to 20°±0.5° C. and stirred evenly at 100 rpm while methyltrimethoxysilane (60 parts by weight) was added dropwise over 6 hours from the dropping funnel. Stirring was continued evenly for 1 hour after the addition to perform hydrolysis and condensation and obtain a suspension of hydrated fine particles of condensed methyltrimethoxysilane (A). The solid and liquid in this suspension (A) were separated by filtration, the resulting cake was washed 3 times with methanol, and the resulting solid powder was dried in a vacuum drier at 100° C. for 3 hours and then heat treated in an atmosphere of nitrogen at 350° C. for 3 hours to obtain organic-inorganic composite particles of a mean particle diameter of 1.81 μm with a coefficient of variation of 7.6% in particle diameter.

When the hardness and mechanical resilience of the resulting composite particles was evaluated by the methods described previously, the elastic modulus in 10% compression was 711 kg/mm$^2$ and residual displacement after 10% deformation was 2.5%. The presence of Si-CH$_3$ bonds and siloxane units in the composite particles was also confirmed by FT-IR analysis. From elemental analysis, the proportion of organic groups in the composite particles, representing the quantity of organic groups by the total weight of carbon atoms, was 13.3 wt %.

When a B5 size ferroelectric liquid crystal display was made by the known method using these composite particles, the number of spacers dispersed could be decreased by ≧10% compared with current organic particle spacers (Epostar GP-H, made by Nippon Shokubai Co., Ltd.), and a liquid crystal display could be made which did not produce low-temperature bubbling or image unevenness which arise when calcined silica particles or non-calcined silica particles made by the sol-gel method were used.

EXAMPLE A2

Organic-inorganic composite particles of mean particle diameter 6.84 μm with a coefficient of variation of 5.9% in particle diameter were obtained as in Example A1 except that methanol (154 parts by weight) and n-propanol (153 parts by weight) were employed instead of the methanol (307 parts by weight) in Example A1, and heat treatment was performed at 750° C. for 1 hour instead of at 350° C. for 3 hours.

The elastic modulus in 10% compression of the resulting composite particles was 750 kg/mm$^2$, and residual displacement after 10% deformation was 3.1%. The presence of Si-CH$_3$ bonds and siloxane units in the composite particles was confirmed by FT-IR analysis, and the proportion of organic groups in the composite particles, representing the quantity of organic groups by the total weight of carbon atoms, was 12.1 wt %.

When a B5 size STN (abbreviation for Super Twisted Nematic) liquid crystal display was made by the known method using these composite particles, the results obtained were similar to those in Example A1.

EXAMPLE A3

Organic-inorganic composite particles of mean particle diameter 4.47 μm with a coefficient of variation of 6.8% in particle diameter were obtained as in Example A1 except that methanol (14 parts by weight) and n-butanol (153 parts by weight) wet employed instead of the methanol (307 parts by weight) in Example A1, and tetraethoxysilane (17 parts by weight) methyltrimethoxysilane (43 parts by weight) were employed instead of methyltrimethoxysilane (60 parts by weight), and heat treatment was performed at 600° C. for 2 hours instead of 350° C. for 3 hours. Here n in Formula (6) was 0.8, since methyltrimethoxysilane was 80 mol % and tetraethoxysilane was 20 mol %.

The elastic modulus in 10% compression of the resulting composite particles was 1606 kg/mm$^2$, and residual displacement after 10% deformation was 4.7%. The presence of Si-CH$_3$ bonds and siloxane units in the composite particles was confirmed by FT-IR analysis, and the proportion of organic groups in the composite particles, representing the quantity of organic groups by the total weight of carbon atoms, was 9.2 wt %.

When a B5 size TFT (abbreviation for Thin Film Transistor) liquid crystal display was made by the known method using these composite particles, the results obtained were similar to those in Example A1; no pixel faults were noted.

EXAMPLE A4

Organic-inorganic composite particles of mean particle diameter 6.15 μm with a coefficient of variation of 6.7% in particle diameter were obtained as in Example A2 except that heat treatment was performed in a mixed atmosphere of nitrogen 95 vol % and oxygen 5 vol % at 450° C. for 2 hours instead of at 750° C. for 1 hour in Example A2.

The elastic modulus in 10% compression of the resulting composite particles was 1440 kg/mm$^2$, and residual displacement after 10% deformation was 3.8%. The presence of Si-CH$_3$ bonds and siloxane units in the composite particles was confirmed by FT-IR analysis, and the proportion of organic groups in the composite particles, represent the quantity of organic groups by the total weight of carbon atoms, was 10.1 wt %.

When a B5 size STN was made by the known method using these composite particles, the results obtained were similar to those in Example A2.

EXAMPLE A5

Organic-inorganic composite particles of mean particle diameter 1.97 μm with a coefficient of variation of 6.9% in particle diameter were obtained as in Example A1 except that methanol (154 parts by weight) and n-butanol (153 parts by weight) employed instead of the methanol (307 parts by weight) in A1, and ethyltrimethoxysilane (60 parts by weight) was employed instead of methyltrimethoxysilane (60 parts weight), and heat treatment was performed at 750° C. for 3 hours instead of 350° C. for 3 hours.

The elastic modulus in 10% compression of the resulting composite particles was 811 kg/mm$^2$, and residual displacement after 10% deformation was 3.2%. The presence of Si—CH$_2$— bonds and siloxane units in the composite particles was confirmed by FT-IR analysis, and the proportion of organic groups in the composite particles, representing the quantity of organic groups by the total weight of atoms, was 12.0 wt %.

When a B5 size ferroelectric liquid crystal display was made by the known method using these composite particles, the results obtained were similar to those in Example A1.

EXAMPLE A6

Organic-inorganic composite particles of mean particle diameter 4.55 μm with a coefficient of variation of 6.8% in particle diameter were obtained as in Example A3 except that heat treatment was performed in air at 200° C. for 5 hours instead of at 600° C. for 2 hours in Example A3.

The elastic modulus in 10% compression of the resulting composite particles was 630 kg/mm$^2$, and residual displacement after 10% deformation was 2.3%. The presence of Si—CH$_3$ bonds and siloxane units in the composite particles confirmed by FT-IR analysis, and the proportion of organic groups in the composite particles, representing the quantity of organic groups by the total weight of carbon atoms, was 14.3 wt %.

When B5 size TFT liquid crystal display was made by the known method using these composite particles, the results obtained were similar to those in Example A1; no pixel faults were noted.

COMPARATIVE EXAMPLE A1

Particles were obtained as in Example A2 except that heat treatment was performed at 80° C. for 2 hours instead of the heat treatment at 750° C. for 1 hour in Example A2.

The elastic modulus in 10% compression of the resulting particles was 312 kg/mm$^2$, and residual displacement after 10% deformation was 2.0%. The proportion of organic groups in the particles, representing the quantity of organic groups by the total weight of carbon atoms, was 18 wt %.

When a B5 size STN liquid crystal display was made by the known method using these particles, the number that needed to be dispersed was the same as for the current organic polymer particle spacers.

COMPARATIVE EXAMPLE A2

Particles were obtained as in Example A3 except that heat treatment was performed at 1150° C. for 1 hour instead of the heat treatment at 600° C. for 2 hours in Example A3.

The elastic modulus in 10% compression of the resulting particles was 3380 kg/mm$^2$, and residual displace after 10% deformation was 6.4%. The proportion of organic groups in the particles, representing the quantity of organic groups by the total weight of carbon atoms, was 1 wt %.

When a B5 size TFT liquid crystal display was made by the known method using these particles, pixel faults were produced due to breakage of the TFT array on the substrate, and image unevenness was produced because mechanical resilience was inadequate.

As regards the numbers of composite particles of the present invention dispersed in the surface of the liquid crystal displays obtained in the Examples above, the numbers of composite particles of the present invention were counted under an optical microscope in arbitrary areas of 1 mm$^2$ in each of 9 fields formed by equal division of the surface (on which to dispersed) into 3 widthwise and lengthwise, and the mean value of the 9 fields was taken to be the number dispersed. The results are given below.

Example A1 . . . Number dispersed 73/mm$^2$

Example A2 . . . Number dispersed 70/mm$^2$

Example A3 . . . Number dispersed 69/mm$^2$

Example A4 . . . Number dispersed 68/mm$^2$

Example A5 . . . Number dispersed 69/mm$^2$

Example A6 . . . Number dispersed 66/mm$^2$

COMPARATIVE EXAMPLE A3

When the current organic particle spacers described in Example A1 are used in making a B5 size STN liquid crystal display by the known method marked image unevenness appeared, and it was unsatisfactory for employment as a liquid crystal display. In this case the number of spacers dispersed, according to the counting method above, was 66/mm$^2$.

EXAMPLE B1

A mixed solution of 25% aqueous ammonia (2.9 g), methanol (10.1 g) and water (141.1 g) (Solution A) was put into a 4-mouthed flask fitted with a condenser, a thermometer and a dropping funnel, and was held at 25°±2° C. and stirred as a mixed solution of γ-methacryloxypropyltrimethoxysilane (27 g), methanol (54 g) and 2,2'-azobis-(2, 4-dimethylvaleronitrile) (0.14 g) as a radical polymerization initiator (Solution B) was added from the dropping funnel and γ-methacryloxypropyltrimethoxysilane was hydrolyzed and condensed. After stirring for a further 20 minutes, radical polymerization was performed by heating in an atmosphere of nitrogen at 70°±5° C.

After heating continuously for 2 hours, the system was cooled to room temperature and a suspension of polymerized particles was obtained. The liquid and solid in this suspension were separated by filtration, the resulting cake was washed 3 times with methanol, and the resulting polymerized particles were vacuum dried in a vacuum drier at 200° C. for 2 hours to give Composite Particles (1).

The resulting Composite Particles (1) had a mean particle diameter of 4.24 μm with a coefficient of variation of 3.8% in particle diameter; the quantity of SiO$_2$ which constitutes the polysiloxane framework was 34.7 wt %; the elastic modulus in 10% compression was 480 kg/mm$^2$, residual displacement after 10% deformation 2.2% and fracture strength 2.4 g. A spectrum (650–800 cm$^{-1}$) attributable to —CH$_2$—CH$_2$— of the organic polymer framework and a spectrum (1150–1300 cm$^{-1}$) attributable to —Si—CH$_2$— were confirmed in Composite Particles (1) by FT-IR analysis.

From these results it is evident that Composite Particles (1) were organic-inorganic composite particles which included an organic polymer framework and a polysiloxane framework having in its molecule organosilicon in which the silicon atom was directly and chemically combined with at least one carbon atom in the organic polymer framework.

A B5 size STN liquid crystal display was made by the known method using these Composite Particles (1). As a result, the number of particles dispersed could be decreased by ≧10% compared with current organic particle spacers (Epostar GP-H, made by Nippon Shokubai Co., Ltd.), and there was neither low-temperature bubbling nor the image unevenness which are produced when calcined silica particles or uncalcined silica gel particles made by the sol/gel method are used.

EXAMPLE B2

Composite Particles (2) were obtained by repeating the procedure of Example B1 except that the composition of Solution B in Example B1 was changed to γ-methacryloxypropyltrimethoxysilane (19.2 g), methanol (51 g), 2,2'-azobis-(2,4-dimethylvaleronitrile) (0.10 g), and tetraethoxysilane dimers-pentamers. (Tamakagaku KK. [Tama Chemical Co.] "Silicate 40", 40 wt % as $SiO_2$) (4.2 g).

The resulting Composite Particles (2) had a mean particle diameter of 2.02 μm with a coefficient of variation of 7.4% in particle diameter; the quantity of $SiO_2$ which constitutes the polysiloxane framework was 42.7 wt %; the elastic modulus in 10% compression was 720 kg/mm$^2$, residual displacement after 10% deformation 3.6% and fracture strength 1.0 g. As in Example B1, a spectrum (650°–800 cm$^{-1}$) attributable to —$CH_2$—$CH_2$— and a spectrum (1150–1300 cm$^{-1}$) attributable to —Si—$CH_2$— were confirmed in Composite Particles (2).

When a B5 size ferroelectric liquid crystal display was made by the known method using these Composite Particles (2) the results obtained were as in Example B1.

EXAMPLE B3

Composite Particles (3) were obtained by repeating the procedure of Example B1 except that the composition of Solution B in Example B1 was changed to γ-methacryloxypropyltrimethoxysilane (40.5 g), methanol (50.6 g), 2,2'-azobis-(4-methoxy-2,4-dimethylvaleronitrile) (0.20 g) and divinylbenzene (4.5 g), and radical polymerization was performed during hydrolyzing and condensing by holding Solution A at 50°±5° C. and stirring in an atmosphere of nitrogen while Solution B was added dropwise over 20 minutes.

The resulting Composite Particles (3) had a mean particle diameter of 8.91 μm with a coefficient of variation of 4.8% in particle diameter; the quantity of $SiO_2$ which constitutes the polysiloxane framework was 29.5 wt %; the elastic modulus in 10% compression was 370 kg/mm$^2$, residual displacement after 10% deformation 2.8% and fracture strength 9.7 g. As in Example B1, a spectrum (650–800 cm$^{-1}$) attributable to —$CH_2$—$CH_2$—and a spectrum (1150–1300 cm$^{-1}$) attributable to —Si—$CH_2$— were confirmed in Composite Particles (3).

When B5 size TN liquid crystal display was made by the known method using these Composite Particles (3) the results obtained were as in Example B1.

EXAMPLE B4

Composite Particles (4) were obtained by repeating the procedure Example B1 except that vinyltrimethoxysilane was used instead of the γ-methacryloxypropyltrimethylsilane in Example B1 and that the particles were calcined in an atmosphere of nitrogen at 600° C. for 2 hours after drying at 200° C. for 2 hours.

The resulting Composite Particles (4) had a mean particle diameter of 4.18 μm with a coefficient of variation of 7.2% in particle diameter; the quantity of $SiO_2$ which constitutes the polysiloxane framework was 40.9 wt %; the elastic modulus in 10% compression was 1050 kg/mm$^2$, residual displacement after 10% deformation 3.2% and fracture strength 1.9 g. As in Example B1, a spectrum (650–800 cm$^{-1}$) attributable to —$CH_2$—$CH_2$— and a spectrum (1150–1300cm$^{-1}$) attributable to —Si—$CH_2$— were confirmed in Composite Particles (4).

In a B5 size STN liquid crystal display was made by the known method using these Composite Particles (4) the are obtained were as in Example B1.

EXAMPLE B5

Composite Particles (5) were obtained by repeating the procedure of Example B1 except that a silica sol ("Snowtex-XS", made by Nissan Chemical Industries, Ltd.; $SiO_2$ 20 wt %; particle diameter 4–6 nm) (15 g) was added to Solution A in Example B1.

The suiting Composite Particles (5) had a mean particle diameter of 4.77 μm with a coefficient of variation of 4.0% in particle diameter; the quantity of $SiO_2$ which constitutes the polysiloxane framework was 42.0 wt %; the elastic modulus in 10% compression was 1130 kg/mm$^2$, residual displacement after 10% deformation 2.5% and fracture strength 3.8 g. As in Example B1, a spectrum (650–800 cm$^{-1}$) attributable to —$CH_2$—$CH_2$— and a spectrum (1150–1300 cm$^{-1}$) attributable to —Si—$CH_2$— were confirmed in Composite Particles (5).

When B5 size TFT liquid crystal display was made by the known method using these Composite Particles (5) the results obtained were as in Example B1.

EXAMPLES B6–B9

Composite Particles (6)–(9) were obtained by repeating the procedure of Example B5 except that the type and quantity of silica sol in Example B5 were changed as shown in Table 1.

The mean particle diameter, coefficient of variation in particle diameter, quantity of $SiO_2$ which constitutes the polysiloxane framework, elastic modulus in 10% compression, residual displacement after 10% deformation and fracture strength of the resulting Composite Particles (6)–(9) are shown in Table 1. As in Example B1, a spectrum (650–800 cm$^{-1}$) attributable to —$CH_2$—$CH_2$— and a spectrum (1150–1300 cm$^{-1}$) attributable to —Si—$CH_2$— were confirmed in Composite Particles (6)–(9).

When B5 size STN liquid crystal displays were made by the known method using these Composite Particles (6)–(9), in all cases the results obtained were as in Example B1.

EXAMPLE B10

Composite Particles (10) were obtained by further heat-treating Composite Particles (8) obtained in Example B8 in a mixed atmosphere of nitrogen 95 vol % and oxygen 5 vol % at 400° C. for 2 hours.

The mean particle diameter, coefficient of variation in particle diameter, quantity of $SiO_2$ which constitutes the polysiloxane framework, elastic modulus in 10% compression, residual displacement after 10% deformation and fracture strength of the resulting. Composite Particles (10) are shown in Table 1. As in Example B1, a spectrum (650–800 cm$^{-1}$) attributable to —$CH_2$—$CH_2$— and a spectrum (1150–1300 cm$^{-1}$) attributable to —Si—$CH_2$— were confirmed in Composite Particles (10).

When a B5 size STN liquid crystal display was made by the known method using these Composite Particles (10) the results obtained were as in Example B1.

TABLE 1

| | | Properties of organic-inorganic composite particles obtained | | | | | |
|---|---|---|---|---|---|---|---|
| Example | Type and quantity (g) of silica sol | Mean particle diameter (μm) | Coefficient of variation in particle diameter (%) | Quantity of SiO$_2$ which constitutes polysiloxane framework (wt %) | Elastic modulus in 10% compression (kg/mm$^2$) | Residual displacement after 10% deformation (%) | Fracture strength (g) |
| 6 | ST-N 15 | 5.18 | 6.0 | 43.3 | 1340 | 3.2 | 3.6 |
| 7 | ST-ZL 15 | 6.34 | 7.9 | 43.6 | 1280 | 3.6 | 5.5 |
| 8 | ST-XS 9.7 | 4.52 | 5.0 | 40.5 | 980 | 2.4 | 3.6 |
| 9 | ST-XS 70.9 | 4.83 | 4.8 | 59.8 | 2650 | 4.1 | 3.4 |
| 10 | ST-XS 9.7 | 4.29 | 5.2 | 45.2 | 1610 | 3.0 | 3.0 |

(Footnote)
ST-N: Snowtex N made by Nissan Chemical Industries, Ltd.; SiO$_2$ 20 wt %; particle diameter 10–20 nm
ST-ZL: Snowtex ZL made by Nissan Chemical Industries, Ltd.; SiO$_2$ 20 wt %; particle diameter 70–100 nm
ST-XS: Snowtex XS made by Nissan Chemical Industries, Ltd.; SiO$_2$ 20 wt %; particle diameter 4–6 nm

EXAMPLE B11

A solution of the acidic dye Kayacyl Sky Blue R (Nippon Kayaku KK) (5 g) dissolved in water (100 g) and a dispersion of Composite Particles (8) obtained in Example B8 (10 g) in water (500 g) were mixed and heat-treated under pressure an autoclave at 150° C. for 1 hour. After treatment, the colored particles were collected by filtration, and after washing 3 times with water they were dried at 200° C. to obtain dark blue colored Composite Particles 11).

The resulting Composite Particles (11) had a mean particle diameter of 4.26 μm with a coefficient of variation of 6.3% in particle diameter; the quantity of SiO$_2$ which constitutes the polysiloxane framework was 40.0 wt %; elastic modulus in 10% compression was 920 kg/mm$^2$, the residual displacement after 10% deformation was 3.0% and the fracture strength was 3.0 g. As in Example B1, a spectrum (650–800 cm$^{-1}$) attributable to —CH$_2$—CH$_2$— and a spectrum (1150–1300 cm$^{-1}$) attributable to —Si—CH$_2$— were confirmed in Composite Particles (11).

When a B5 size STN liquid crystal display was made by the method using these Composite Particles (11) the results obtained were as in Example B8, and there were fewer bright slots (light escape).

EXAMPLE B12

Black colored Composite Particles (12) were obtained by dissolving the basic dye Kayacryl Black NP200 (Nippon Kayaku KK) (5 g) in water (300 g) and, after bringing the pH to 4 by adding acetic acid, adding Composite Particles (8) obtained in Example B8 (10 g) and stirring thoroughly while heat-treating at 95° C. for 8 hours.

The resulting Composite Particles (12) had a mean particle diameter of 4.41 μm with a coefficient of variation of 5.7% in particle diameter; the quantity of SiO$_2$ which constitutes the polysiloxane framework was 40.2, wt %; the elastic modulus in 10% compression was 920 kg/mm$^2$ the residual displacement after 10% deformation was 2.8% and the fracture strength was 3.4 g. As in Example B1, a spectrum (650–800 cm$^{-1}$) attributable to —CH$_2$—CH$_2$— and a spectrum (1150–1300 cm$^{-1}$) attributable to —Si—CH$_2$— were confirmed in Composite Particles (12).

When a B5 size STN liquid crystal display was made by the known method using these Composite Particles (12) the results obtained were as in Example B11.

EXAMPLE B13

B1 colored Composite Particles (13) were obtained by repeating the procedure of Example B8 except for the addition of 1 g of the basic dye Kayacryl Black NP200 (Nippon Kayaku KK) to Solution A in Example B8.

The resulting Composite Particles (13) had a mean particle diameter of 4.53 μm with a coefficient of variation of 5.1% in particle diameter; the quantity of SiO$_2$ which constitutes the polysiloxane framework was 40.4 wt %; the elastic modulus in 10% compression was 970 kg/mm$^2$, the residual displacement after 10% deformation was 2.5% and the fracture strength was 3.6 g. As in Example B1, a spectrum (650–800 cm$^{-1}$) attributable to —CH$_2$—CH$_2$— and a spectrum (1150–1300 cm$^{-1}$) to —Si—CH$_2$— were confirmed in Composite Particles (13).

When B5 size STN liquid crystal display was made by the known method using these Composite Particles (13) the results obtained were as in Example B11.

EXAMPLE B14

Composite Particles (14) having an adhesive layer on the surface were obtained by mixing Composite Particles (8) obtained in Example B8 (30 g) with thermoplastic resin particles (methyl methacrylate 84 wt % and n-butyl acrylate 16 wt % copolymer; glass transition temperature 70° C., mean particle diameter 0.3 μm) (2 g) and then coating the surface of the Composite Particles (8) with the thermoplastic resin using a Nara Kikai Seisakusho Hybridization System Model NHS-O. When the resulting Composite Particles (14) were observed by SEM, the surface of the Composite Particles (8) was completely covered with thermoplastic resin, and when the cross-section was observed by TEM, the thickness of the coating layer was 0.2 μm.

When a B5 size STN liquid crystal display was made by the known method using these Composite Particles (14) having an adhesive layer the results obtained were as in Example B1. Moreover, the resulting liquid crystal display gave absolutely no change in image quality in the same picture before and after vibration using a vibrator.

EXAMPLE B15

Black colored Composite Particles (15) having an adhesive layer on the surface were obtained by repeating the procedure of Example B14 except that the black colored Composite Particles (13) obtained in Example B13 were employed instead of Composite Particles (8) in Example B14. When the resulting Composite Particles (15) were observed by SEM, the surface of the Composite Particles (13) was completely covered with thermoplastic resin, and when the cross-section was observed by TEM, the thickness of the coating layer was 0.2 µm.

When B5 size STN liquid crystal display was made by the known method using these black colored Composite Particles 15) having an adhesive layer the results obtained were as in Example B14.

EXAMPLE B16

Composite Particles (16) having a conductive layer on the surface of the particle body were obtained by electroless Ni plating of Composite Particles (8) obtained in Example B8. The resulting Composite Particles (16) had a mean particle diameter of 4.92 µm and a coefficient of variation of 5.4% in particle diameter. When the resulting Composite Particles (16) were observed by SEM and XMA, the complete su face of the Composite Particles (16) was Ni plated; and the cross-section was observed by TEM, the thickness of the coating layer was 0.3 µm.

EXAMPLE B17

Composite Particles (17) having a conductive layer on the surface of the particle body were obtained by electroless Ni plating of Composite Particles (8) obtained in Example B8, followed by electroless gold plating. The resulting Composite Particles (17) had a mean particle diameter of 5.05 µm and a coefficient of variation of 5.5% in particle diameter. When the resulting Composite Particles 17) were observed by SEM and XMA, the complete surface of the Composite Particles (17) was Ni plated, with a covering of gold plate on top; and when the cross-section was observed by TEM, the thickness of the coating layer was 0.5 µm.

EXAMPLE B18

The solid and liquid of the suspension of Polymerized Particles (1) obtained in Example B1 were separated by decantation, and the resulting cake was dried overnight at room temperature. A portion of this dried cake (5 g) was taken, and after dispersing in isopropyl alcohol (200 g) using ultrasonication, dibutyltin dilaurate (0.5 g) was added to the dispersion and the mixture was stirred as it was heated at 80° C. for 2 hours. After obtaining in this way a suspension of recondensed particles (18), solid-liquid separation, washing and drying were performed as in Example B1, to obtain Composite Particles (18).

The resulting Composite Particles (18) had a mean particle diameter of 4.20 µm with a coefficient of variation of 3.9% in particle diameter; the quantity of $SiO_2$ which constitutes the polysiloxane framework was 35.1 wt %; the elastic modulus in 10% compression was 950 kg/mm², the residual displacement after 10% deformation was 1.8% and the fracture strength was 3.0 g. As in Example B1, a spectrum (650–800 m$^{-1}$) attributable to —$CH_2$—$CH_2$— and a spectrum (1150–1300 cm$^{-1}$) attributable to —Si—$CH_2$— were confirmed in Composite Particles (18).

When a B5 size STN liquid crystal display was made by the known method using these Composite Particles (18) the results obtained were as in Example B1.

COMPARATIVE EXAMPLE B1

Particles were obtained by further heat treatment of Composite Particles (1) obtained in Example B1 at 950° C. for 2 hours. The quantity of $SiO_2$ which constitutes the polysiloxane framework in these particles was 99.8 wt %; and it was also evident from FT-IR analysis that they were silica particles in which the polymer framework had decomposed and undergone combustion. The elastic modulus in 10% compression of the particles obtained was 3250 kg/mm², residual displacement after 10% deformation was 6.2%. When a B5 size liquid crystal display was made by the known method using these particles, pixel faults were produced due to breakage of the TFT array on the electrode substrates, and image unevenness was produced because mechanical resilience was inadequate.

As regards the numbers of composite particles of the present invention dispersed in the surface of the liquid crystal displays obtained in the examples above, the numbers of composite particles of the present invention were counted under an optical microscope in arbitrary areas of 1 mm² in each of 9 fields formed by equal division of the surface (on which to be dispersed) into 3 widthwise and lengthwise, and the mean value of the 9 fields was taken to be the number dispersed. The results are given below.

Example B1 . . . Number dispersed 73/mm²
Example B2 . . . Number dispersed 70/mm²
Example B3 . . . Number dispersed 69/mm²
Example B4 . . . Number dispersed 68/mm²
Example B5 . . . Number dispersed 69/mm²
Example B6 . . . Number dispersed 66/mm²
Example B7 . . . Number dispersed 64/mm²
Example B8 . . . Number dispersed 68/mm²
Example B9 . . . Number dispersed 52/mm²
Example B10 . . . Number dispersed 63/mm²
Example B11 . . . Number dispersed 70/mm²
Example B12 . . . Number dispersed 69/mm²
Example B13 . . . Number dispersed 71/mm²
Example B14 . . . Number dispersed 69/mm²
Example B15 . . . Number dispersed 70/mm²
Example B18 . . . Number dispersed 65/mm²

COMPARATIVE EXAMPLE B2

When B5 size STN liquid crystal display was made by the known method using the current organic particles described in Example B1, considerable image unevenness was produced and it was unsuitable for employment as a liquid crystal delay. In this case the number of spacers dispersed, according to the counting method above, was 66/mm².

Various details of the invention may be changed without departing from its spirit not its scope. Furthermore, the foregoing description of the preferred embodiment according to the present invention is provided for the purpose of illustration only, and not for the purpose of limiting the invention as defined by the appended claims and their equivalents.

What is claimed is:

1. A liquid crystal display, which comprises:

a first electrode substrate;

a second electrode substrate arranged opposite to said first electrode substrate;

a sealing material which binds said first electrode substrate and said second electrode substrate at their respective circumferencial edges;

a spacer for the liquid crystal display, which is interposed between said first electrode substrate and said second electrode substrate, and which includes an organic-inorganic composite particle; and a liquid crystal packed into space defined by said first electrode substrate and said second electrode substrate and said sealing material;

wherein said organic-inorganic composite particle includes a particle body having an elastic modulus of 350–3000 kg/mm$^2$ in 10% compression, a residual displacement of 0–5% after 10% deformation, a mean particle diameter of 0.5–50 μm and a coefficient of variation of 20% or less in particle diameter, said particle body including:

an organic group; and a polysiloxane framework which has in its molecule an organosilicon containing a silicon atom directly and chemically combined with at least one carbon atom of said organic group.

2. A liquid crystal display as claimed in claim 1, wherein said organic-inorganic composite particle further has an adhesive layer formed on a surface of said particle body.

3. A liquid crystal display as claimed in claim 1, wherein said organic-inorganic composite particle is colored by including in said particle body at least one selected from the group consisting of dyes and pigments.

4. A liquid crystal display, which comprises:

a first electrode substrate;

a second electrode substrate arranged opposite to said first electrode substrate;

a sealing material which binds said first electrode substrate and said second electrode substrate at their respective circumferencial edges;

a spacer for the liquid crystal display, which is interposed between said first electrode substrate and said second electrode substrate, and which includes an organic-inorganic composite particle; and a liquid crystal packed into space defined by said first electrode substrate and said second electrode substrate said sealing material;

wherein said organic-inorganic composite particle includes particle body having a mean particle diameter of $\geq 0.5$ μm and including:

an organic polymer framework; and a polysiloxane framework which has in its molecule an organosilicon containing a silicon atom directly and chemically combined with at least one carbon atom of said polymer framework, wherein the quantity of $SiO_2$ constituting said polysiloxane framework is $\geq 25$ wt %.

5. A liquid crystal display as claimed in claim 4, wherein said organic-inorganic composite particle further has an adhesive layer formed on a surface of said particle body.

6. A liquid crystal display as claimed in claim 4, wherein said organic-inorganic composite particle is colored by including in said particle body at least one selected from the group consisting of dyes and pigments.

* * * * *